(12) United States Patent
Wilson et al.

(10) Patent No.: US 9,805,483 B2
(45) Date of Patent: Oct. 31, 2017

(54) ENHANCED RECOGNITION OF CHARTED DATA

(71) Applicant: Microsoft Technology Licensing, LLC, Redmond, WA (US)

(72) Inventors: Aaron Lamar Wilson, Seattle, WA (US); Daniel Parish, Seattle, WA (US); Yi Zhang, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 578 days.

(21) Appl. No.: 14/465,317

(22) Filed: Aug. 21, 2014

(65) Prior Publication Data

US 2016/0055659 A1    Feb. 25, 2016

(51) Int. Cl.
| | |
|---|---|
| G06F 3/048 | (2013.01) |
| G06T 11/20 | (2006.01) |
| G06F 3/0484 | (2013.01) |
| G06F 3/0488 | (2013.01) |
| G06K 9/00 | (2006.01) |

(52) U.S. Cl.
CPC ........ G06T 11/206 (2013.01); G06F 3/04842 (2013.01); G06F 3/04847 (2013.01); G06F 3/04883 (2013.01); G06K 9/00476 (2013.01); G06K 9/00456 (2013.01); G06T 2207/10004 (2013.01); G06T 2207/20072 (2013.01)

(58) Field of Classification Search
CPC .............. G06T 11/206; G06F 3/04842; G06F 3/04847; G06F 3/04883
USPC ........................................................ 715/763
See application file for complete search history.

(56) References Cited

U.S. PATENT DOCUMENTS

| | | | |
|---|---|---|---|
| 6,337,924 B1 | 1/2002 | Smith | |
| 7,953,295 B2 | 5/2011 | Vincent et al. | |
| 8,090,225 B2 | 1/2012 | Lapstun et al. | |
| 8,509,563 B2 | 8/2013 | Robinson et al. | |
| 8,780,232 B2 * | 7/2014 | Craig ................ | H04N 5/232 348/240.3 |
| 9,277,063 B2 * | 3/2016 | Kido ................ | H04N 1/00013 |

(Continued)

FOREIGN PATENT DOCUMENTS

CN        102855232 A    1/2013

OTHER PUBLICATIONS

Embley, et al., "Table-procrssing paradegms: a research survey," International Journal of Document Analysis, published May 9, 20016, 22 pages.

(Continued)

*Primary Examiner* — David Phantana Angkool
(74) *Attorney, Agent, or Firm* — Scott Y. Shigeta; Newport IP, LLC

(57) ABSTRACT

An image including a chart displaying graphical elements may be received or captured by a computing device. The graphical elements, for example, may be bars of a bar chart, or components of a pie chart. Techniques described herein may determine values for the graphical elements. Techniques described herein may also analyze the arrangement of the graphical elements and other contextual information to determine a chart type. The generated values may be arranged into an editable chart and/or an editable data structure based on the chart type. Touch-enabled gestures may be applied to the data structure to allow a user to modify, save or otherwise process the data structure.

19 Claims, 13 Drawing Sheets

(56) References Cited

U.S. PATENT DOCUMENTS

| | | | |
|---|---|---|---|
| 9,291,618 B2* | 3/2016 | Hendi | G01N 33/52 |
| 9,444,702 B1* | 9/2016 | Raponi | H04L 43/045 |
| 9,501,701 B2* | 11/2016 | Wood | G06K 9/00711 |
| 9,524,429 B2 | 12/2016 | Zhang | |
| 9,558,170 B2* | 1/2017 | Barrus | G06F 17/245 |
| 2006/0081714 A1 | 4/2006 | King et al. | |
| 2008/0024502 A1 | 1/2008 | Nagahara et al. | |
| 2011/0164813 A1 | 7/2011 | Enomoto | |
| 2011/0225490 A1 | 9/2011 | Meunier | |
| 2012/0173226 A1 | 7/2012 | McEvoy et al. | |
| 2012/0180002 A1 | 7/2012 | Campbell et al. | |
| 2012/0189203 A1* | 7/2012 | Lin | G06F 17/30253 382/181 |
| 2013/0076617 A1 | 3/2013 | Csaszar et al. | |
| 2013/0191715 A1 | 7/2013 | Raskovic et al. | |
| 2014/0104279 A1 | 4/2014 | Albrecht | |
| 2014/0156358 A1* | 6/2014 | Varadarajan | G06Q 10/00 705/7.42 |
| 2014/0173402 A1 | 6/2014 | Bastide et al. | |
| 2014/0173517 A1 | 6/2014 | Chaudhri | |
| 2015/0310043 A1 | 10/2015 | Adelman | |
| 2015/0356365 A1* | 12/2015 | Collet | G06K 9/18 382/177 |
| 2016/0055374 A1 | 2/2016 | Zhang et al. | |
| 2016/0055659 A1 | 2/2016 | Wilson et al. | |
| 2017/0109573 A1* | 4/2017 | Collet | G06K 9/00422 |

OTHER PUBLICATIONS

Office action for U.S. Appl. No. 14/465,307, dated Jan. 29, 2016, Zhang et al., "Enhanced Interpretation of character Arrangements", 8 pages.

International Search Report and Written Opinion issued in PCT Application No. PCT/US2015/045778, dated Dec. 15, 2015, a counterpart to U.S. Appl. No. 14/465,3076, 15 pages.

"ABBYY FineReader 12.0.101.264", Published on: Jul. 11, 2013 Available at: http://www.softexia.com/office-tools/abbyy-finereader/, 10 pp.

"Introducing OmniPage Cloud Service", Published on: Sep. 4, 2012, Available at: http://www.nuance.com/for-business/by-product/omnipage/omnipage-cloud-services/index.htm, 3 pp.

"ScanSnap ix500 Scanning into Excel", Published on: Feb. 20, 2014, Available at: http://www.youtube.com/watch?v=PvpH4NAzUjM, 2 pp.

"OmniPage Standard 18", Published on: Oct. 27, 2010, Available at: http://ocr-software-review.toptenreviews.com/omnipage-standard-review.html, 3 pp.

"Pearl scan solutions", Published on: Aug. 21, 2008, Available at: http://www.pearl-scan.co.uk/document-conversion/OCR-conversion.php, 2 pp.

"Fujitsu Scansnap iX500", Published on: Jan. 11, 2013, Available at: http://scanners.fcpa.fujitsu.com/scansnapit/scansnap-ix500.php, 4 pp.

"Chronoscan", Published on: Jan. 26, 2013, Available at: http://www.chronoscan.org/index.php?lang=en, 3 pp.

PCT Second Written Opinion dated Jul. 12, 2016 for PCT Applicaton No. PCT/US2015/045780, 4 pages.

Gao, et al, "View: Visual Information Extraction Widget for Improving Chart Images Accessibility", In Proceedings of the 19th International Conference on Image Processing, Sep. 30, 2012, pp. 2865-2868.

Mischenko, et al., "Chart Image Understanding and Numerical Data Extraction", In Proceedings of the 6th International Conference on Digital Information Management, Sep. 26, 2011, pp. 115-120.

International Search Report and Written Opinion issued in PCT Applicaton No. PCT/US2015/045780 dated Oct. 22, 2015, 11 pages.

Savva, et al., "Revision: Automated Classification, Analysis and Redesign of Chart Images," In Proceedings of the 24th Annual ACM Symposium on User Interface Software and Technology, Oct. 16, 2011, pp. 393-492.

"International Preliminary Report on Patentability Issued in PCT Application No. PCT/US2015/045780", dated Nov. 3, 2016, 5 Pages.

"Notice of Allowance Issued in U.S. Appl. No. 14/465,307", dated Aug. 12, 2016, 8 Pages.

"Notice of Allowance Issued in U.S. Appl. No. 14/465,307", dated Jun. 6, 2016, 8 Pages.

U.S. Appl. No. 15/352,485, Non Final Office Action dated Apr. 27, 2017, 9 pages.

* cited by examiner

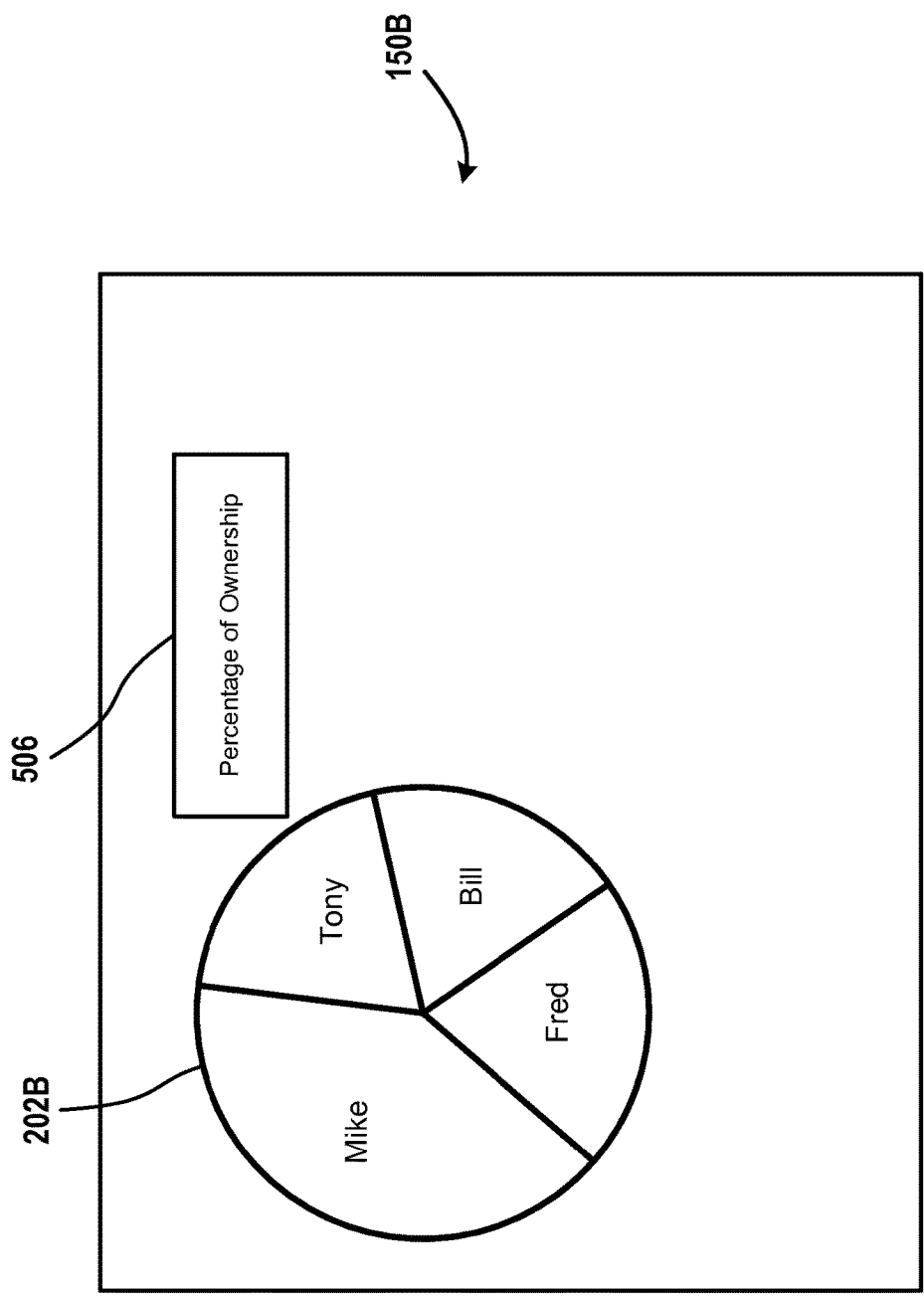

ENHANCED RECOGNITION OF CHARTED DATA

BACKGROUND

As technological advances further the performance and affordability of digital imaging components, computers and portable devices are more frequently used to capture and process images of printed documents. There are a number of applications that use different technologies, including optical character recognition ("OCR"), to process images of printed documents. For instance, some applications use such technologies to convert a printed document into a text file.

Although computers may generate files that include OCR-generated text, current technologies may still be limiting. For instance, when an image includes text arranged in complex formats and other contextual markings, manual interpretation and manual data entry may be required to ensure that the information conveyed in the image is entered correctly. Such time consuming, error prone processes may be inefficient and could lead to a less than desirable user experience.

It is with respect to these and other considerations that the disclosure made herein is presented.

SUMMARY

Technologies are described herein for providing enhanced recognition of charted data. Generally described, techniques disclosed herein interpret various aspects of an image of charted data, which may include any graphical arrangement indicating one or more values, to generate an editable data structure containing data tables and/or charts. An image including a chart or other arrangement displaying graphical elements may be received or captured by a computing device. A graphical element may be any item in the image that conveys a value. For example, a graphical element may be bars of a bar chart, dots of a scatter chart or sections of a pie chart.

Techniques described herein may determine values for graphical elements that are displayed or printed on a medium. The medium may include any electronic medium or any other physical medium capable of displaying any data and/or graphical arrangement. In one aspect, the value may be determined by a measurement of the graphical element. In another aspect, the value may be determined by an interpretation of optically recognizable data, such as text describing one or more graphical elements of the chart. In other aspects, the arrangement of the graphical elements and/or other contextual information associated with the image may be interpreted to determine a chart type. The determined values may be arranged into a data structure based on the chart type. For example, the data structure may be in the form of a spreadsheet file that may be rendered to display an editable chart that is based on the chart contained in the image. Touch-enabled controls may be applied to the presentation of the data structure to allow a user to modify, save or otherwise process the data structure.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5A illustrates an example image that includes a pie chart displayed with descriptive text.

DETAILED DESCRIPTION

Figure 1:
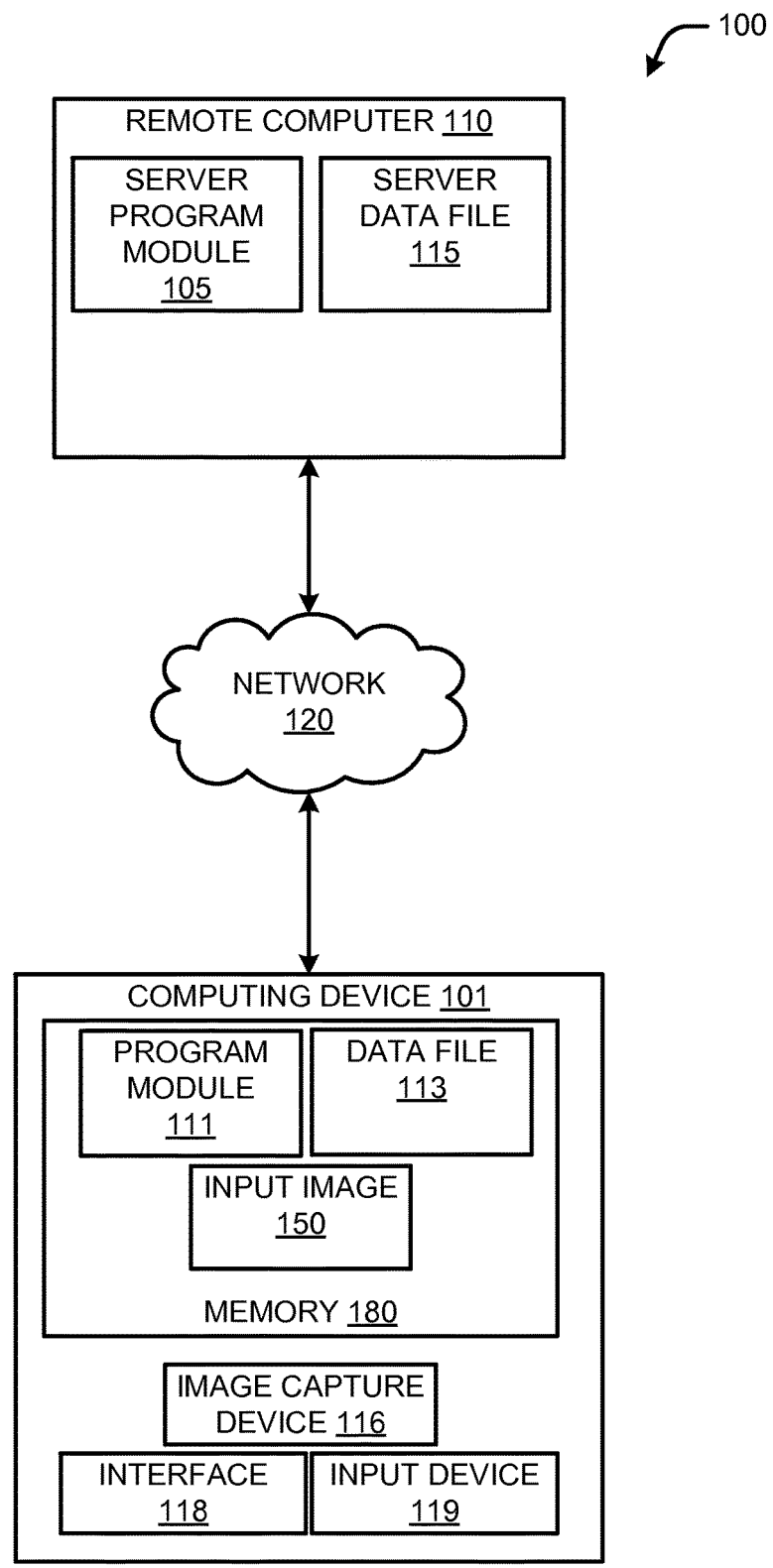
FIG. 1 is a block diagram showing several example components of a system for providing enhanced recognition of charted data.

The following detailed description is directed to concepts and technologies for providing enhanced recognition of charted data. Generally described, techniques disclosed herein interpret various aspects of an image of charted data, which may include any graphical arrangement indicating one or more values, to generate an editable data structure containing data tables and/or charts. An image including a chart displaying graphical elements may be received or captured by a computing device. The graphical elements, for example, may be bars of a bar chart, or components of a pie chart.

Techniques described herein may determine values for the graphical elements. In one aspect, the value may be determined by a measurement of the graphical element. For example, a value may be determined by measuring the length of a bar of a bar chart, or by measuring any other characteristic such as the angles of a pie chart or the surface area of a component of a pie chart. In another aspect, the value may be determined by identifying optically recognizable data, such as text describing one or more graphical elements of the chart.

In other aspects, the arrangement of the graphical elements and other contextual information associated with the image may be interpreted to determine a chart type, e.g., a pie chart, bar chart or any other type of chart. The generated values may be arranged into an editable data structure based on the chart type. For example, the data structure may be in the form of a spreadsheet file that can be rendered to display an editable chart that is visually similar to the chart contained in the image. Touch-enabled controls may be applied to the data structure to allow a user to modify, save or otherwise process the chart defined by the data structure.

In some implementations, the generated data structure may also be configured to store additional metadata. In one example, the metadata may include the image that is captured or obtained by the computing device. In such implementations, various applications using the generated data structure may utilize the stored image as a reference point to validate one or more characteristics of the editable chart and/or other aspects of the data structure.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for providing enhanced recognition of charted data. As will be described in more detail below with respect to FIGS. 8-10, there are a number of applications and services that can embody the functionality and techniques described herein.

FIG. 1 is a system diagram showing aspects of one illustrative mechanism disclosed herein for providing enhanced recognition of charted data. As shown in FIG. 1, a system 100 may include a computing device 101, a remote computer 110 and a network 120. The computing device 101 may operate as a stand-alone device, or the computing device 101 may operate in conjunction with the remote computer 110. As can be appreciated, the remote computer 110 and the computing device 101 are interconnected through one or more local and/or wide area networks, such as the network 120. It should be appreciated that many more network connections may be utilized than illustrated in FIG. 1.

The computing device 101 may include a local memory 180 that stores a data file 113 and a program module 111 configured to manage interactions between a user and the computing device 101. The program module 111 may be in the form of a stand-alone application, a productivity application, an operating system component or any other application or software module having features that interact with the user via an input device 119, such as a keyboard, and/or an interface 118, which may include a touch-enabled screen configured to receive gestures from the user. The program module 111 may also control an image capture device 116.

In aspects disclosed herein, the image capture device 116 may be configured to capture and/or obtain input images of a medium having arranged characters or graphical elements, such as a printed document. The image capture device 116 may be a scanner, web camera ("web cam"), camera phone, hand held camera, etc. In another example, the image capture device 116 may utilize hardware and software that is configured to perform a screen capture on any type of device. In addition, the program module 111 may be configured to receive input images from other devices, such as the remote computer 110 or any other computing device. The captured or received input image data may be stored as a file, such as the input image 150 of FIG. 1. As can be appreciated, the captured or received input image data may also be stored in a data file 113 or other module or data structure. The data file 113 may also store one or more data structures formed, processes, modified and/or generated by techniques disclosed herein.

The program module 111 may be configured to utilize one or more OCR technologies to detect any optically recognizable characters printed or displayed on a medium. In addition to recognizing characters, technologies disclosed herein may interpret other aspects of an image, such as any lines, spaces, markings and/or any type of arrangement that is printed or displayed on a medium. For example, a captured image may include an arrangement of graphical elements, such as charts, lines, dots, bars, or any visual indicator expressing a value or other information. The program module 111 and/or other components of the system 100 may also be configured to recognize and/or interpret other aspects of printed or displayed characters, such as specific keywords, number or letter patterns, etc. As will be described below, some characters or markings may be identified as descriptive text, such as a title, header, etc. As will be described in more detail below, based on one or more factors, the descriptive text and other aspect of the image may determine one or more chart types and other contextual information which may be used to generate editable data tables and charts.

The remote computer 110 may be in the form of a server computer or a number of server computers configured to store a server program module 105, a server data file 115 and other information associated with the user and related applications. As can be appreciated, the remote computer 110 may store a mirrored copy of the data file 113 allowing a centralized service to coordinate and assist a number of client computers, such as the computing device 101.

It can also be appreciated that the server program module 105 may be used to assist program modules executing on client computers, such as the program module 111 executing on the computing device 101. For example, as described below, the program module 111 may be configured to process an input image, and in such an implementation, the server program module 105 may be used to assist in such processing. In such implementations, all or part of the input image files and user interactions, such as those through the interface 118, may be communicated from the computing device 101 to the remote computer 110. Various operations, e.g., OCR-related operations and/or image processing operations, may be performed, at least in part, by the server program module 105. In other implementations, the computing device 101 may also function as a stand-alone device. Output data from such operations may be stored in the server data file 115 and/or the data file 113.

Figure 2:
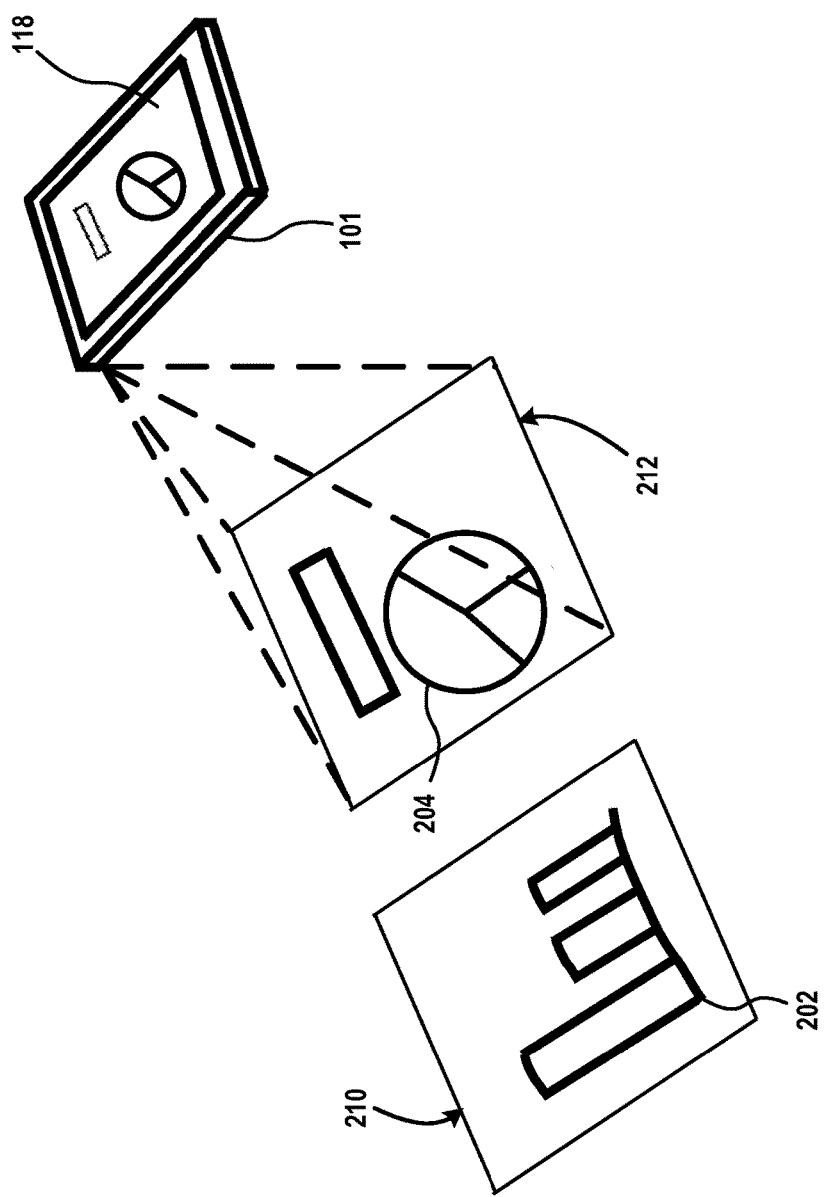
FIG. 2 is perspective view of a device for capturing an image of a chart with a number of graphical elements.

FIG. 2 shows an example scenario that illustrates how the system 100 is used for providing enhanced recognition of charted data. As shown in FIG. 2, the computing device 101 utilizes the image capture device 116 to capture an image of charted data. As summarized above, charted data may include any graphical arrangement indicating one or more values, to generate an editable data structure containing data tables and/or charts. In this illustrative example, the charted data is printed on a first page 210 and a second page 212. As will be described below, techniques described herein generate an editable data structure containing data tables and/or charts that may be based, at least in part, on the charted data depicted in one or more images.

In addition to generating a data structure containing data tables and charts that may be based on the charted data depicted in one or more images, techniques provided herein also provide a real-time, or near real-time, display of the data structure on a user interface, such as interface 118. As will be described in more detail below, the interface 118, which may have touch-enabled input features, may enable a user to edit, select and/or process the displayed data as the image capture device 116 is capturing the input image. In addition, the generated data may be saved in a file, such as data file 113 or server data file 115, and/or the generated data may be merged with other data of other existing files.

Figure 3:
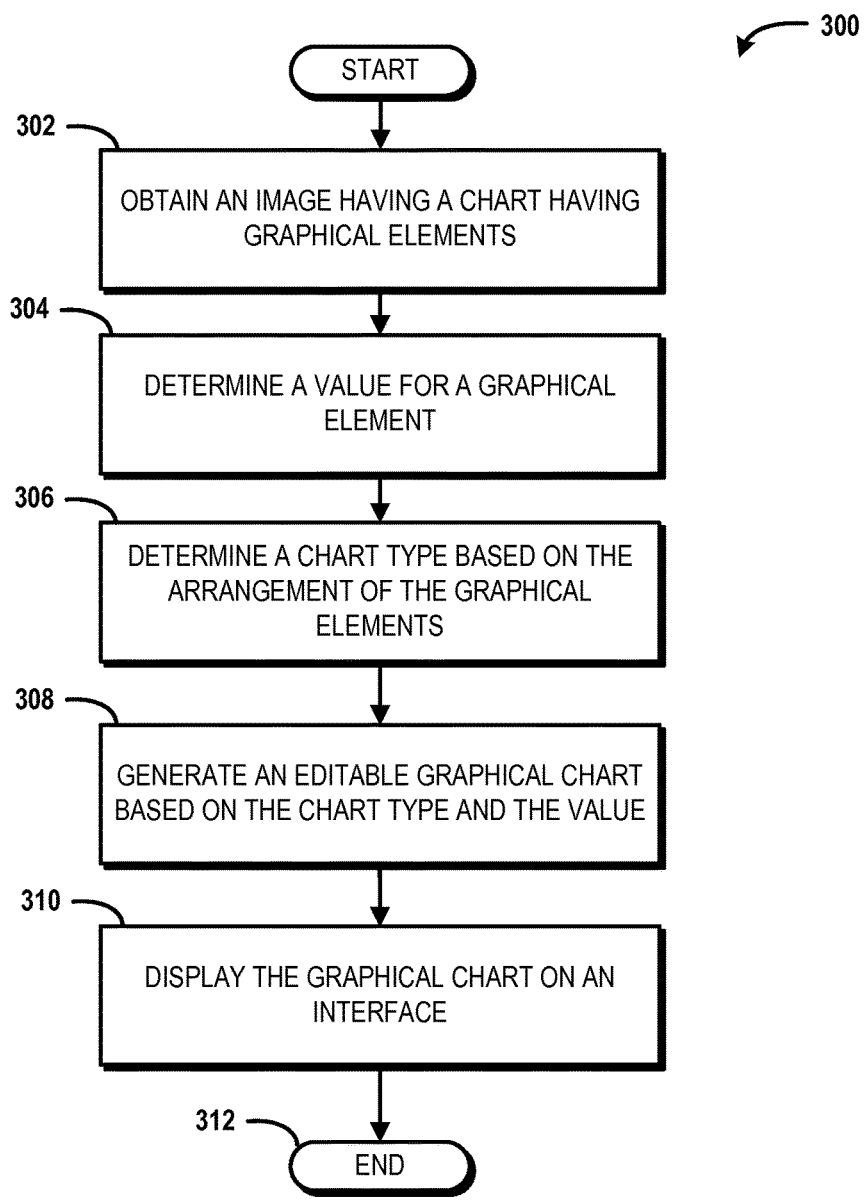
FIG. 3 is a flow diagram illustrating aspects of a method for providing enhanced recognition of charted data.

Turning now to FIG. 3, aspects of a routine 300 for providing enhanced recognition of charted data are shown and described below. Although the following description involves an example that involves the processing of charted data that is displayed or printed on a medium, it should be understood that the operations of the methods disclosed herein may apply to other forms of arranged data and other forms of generated output. As will be described below, data types may be identified by the use of different format attributes, content, character arrangements, patterns and other context information. The identified data types, and other factors, may be used to arrange the output data.

It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As will be described in more detail below, in conjunction with FIGS. 8-10, the operations of the routine 300 are described herein as being implemented, at least in part, by an application, such as the program module 111. Although the following illustration refers to the program module 111, it can be appreciated that the operations of the routine 300 may be also implemented in many other ways. For example, the routine 300 may be implemented by the use of a spreadsheet application 813 or any other application, e.g., a word processing application, customer relationship management (CRM) software, etc. In addition, one or more of the operations of the routine 300 may alternatively or additionally be implemented, at least in part, by a web browser application 810 of FIG. 8 or another application working in conjunction with one or more application servers 908 of FIG. 9.

With reference to FIG. 3, the routine 300 begins at operation 302, where the program module 111 obtains an image. As can be appreciated, the image may be captured by the image capture device 116 or obtained by the program module 111 using any other mechanism for communicating and/or capturing images, also referred to herein as "input images." For example, the input image may be captured by taking a picture of a receipt, a book, a piece of paper with text/handwriting or any other medium capable of displaying graphics and/or text. In addition to being captured by the image capture device 116, such as a camera, the input image may be extracted from a static image, such as a picture, or a motion image file, such as a video. In a specific example, the input image may include a chart, table, graph and/or any data or arrangement that conveys one or more values. The techniques disclosed herein interpret charts and, potentially, other arrangements having one or more graphical elements. A graphical element of a chart may be any item in the image that represents or communicates a value. For example, a graphical element may be bars of a bar chart, dots of a scatter chart or components of a pie chart. As can be appreciated, the image may include handwritten and/or printed arrangements, markings or data.

Next, at operation 304, the program module 111 determines a value for one or more graphical elements. According to aspects disclosed herein, the program module 111 may determine a value by performing one or more operations, or a combination of operations, to analyze aspects of the image. In some aspects, the program module 111 may measure the size, shape and/or other aspects of a graphical element to determine a value, also referred to herein as the "determined value." For example, if the image includes a bar chart, the program module 111 may measure the length or other dimensions of one or more graphical elements, such as the length of a bar. The program module 111 may then determine one or more values based on one or more measurements. As will be explained in more detail below with respect to FIGS. 5A-5B, such techniques of operation 304 may involve an analysis of various shapes, proportions and/or aspects of one or more graphical elements to determine one or more associated values.

In addition, or as an alternative technique, to the measurement of a graphical element, the program module 111 may determine a value of a graphical element by associating optically recognizable data with the graphical element and generating the value based on an interpretation of the optically recognizable data. Such techniques may apply one or more OCR techniques to text or characters that may be associated to the graphical element. For example, if an image includes a bar chart with numbers positioned near individual bars, a particular number may be associated with a bar and converted into machine-readable data, also referred to herein as the "determined value." As will be explained in more detail below, the determined value may be used in further processing to generate a data structure, such as an editable spreadsheet. As will be explained in more detail below with respect to FIGS. 4A and 4B, various techniques for processing associated text or characters to determine a value are described in more detail below. As will also be explained below, operation 304 may also involve the interpretation of descriptive text and other contextual information to generate data that may be utilized in operations of routine 300.

Next, in operation 306, the program module 111 determines a chart type based on one or more graphical elements and/or other aspects of the image. According to aspects disclosed herein, the program module 111 may determine a chart type by analyzing a format, pattern, shape, color of one or more graphical elements. For example, if an image contains a chart having a number of horizontally positioned lines, the program module 111 may determine that the chart type is a line chart. In another example, if an image contains a chart having lines dissecting a circle, the program module 111 may determine that the chart type is a pie chart. As can be appreciated, these examples are provided for illustrative purposes and are not to be construed as limiting. In particular, it can be appreciated that various operations may be performed in other ways. For instance, operations 304 and 306 may be reverse. In such implementations, the chart type may be determined first and then the specific values may be determined according to the chart type and the graphical elements. Additional details and examples of other chart types are described below and shown in FIG. 4A through FIG. 6.

Next, at operation 308, the program module 111 may generate a graphical chart based on the chart type and/or the one or more determined values. In one example implementation, the program module 111 may generate a data structure storing one or more determined values arranged in a table or spreadsheet. In addition, the data structure may include a chart configured with graphical elements that represent the determined values. The determined chart type may be used to arrange aspects of the chart. For instance, the arrangement of the chart may be in the form of a pie chart, line chart, bar chart, or other type of chart depending on the determined chart type. As can be appreciated, any data structure generated in operation 308 may be configured to be editable by one or more software modules, such as a spreadsheet application, an operating system, or any other module configured to read and modify files. It can also be appreciated that data displayed in an input image is not editable in the same manner as the data of the generated data structure. Illustrative examples of these and other aspects are described in more detail below and shown in FIGS. 5A, 5B and 6.

In some implementations, operation 308 may also utilize other characteristics interpreted from the image to influence the generated graphical chart. For instance, the orientation, color, style or other visible characteristics of one or more objects in the image may be used to influence the appearance of the graphical chart. For example, if the image includes a chart with gold, silver and bronze medals for each country, a generated graphical chart may use those colors to depict the medal types as opposed to labeling the graphical elements with text. In other non-limiting examples, implementations may utilize the orientation of a chart shown in an input image to orient the generated graphical chart in a similar manner.

Once the program module 111 generates the graphical chart and/or a data structure including determined values and a graphical chart, the routine 300 continues at operation 310 where the program module 111 may display the graphical chart on the interface 118 of the computing device 101. Once displayed, a user of the computing device 101 may interact with the graphical chart and the determined values. As described in more detail below, the computing device 101 and the program module 111 may be configured to allow a user to edit, save, process and/or communicate the graphical chart and the determined values. Illustrative examples of these and other aspects are described in more detail below and shown in FIG. 4A through FIG. 7B.

Figure 4A:
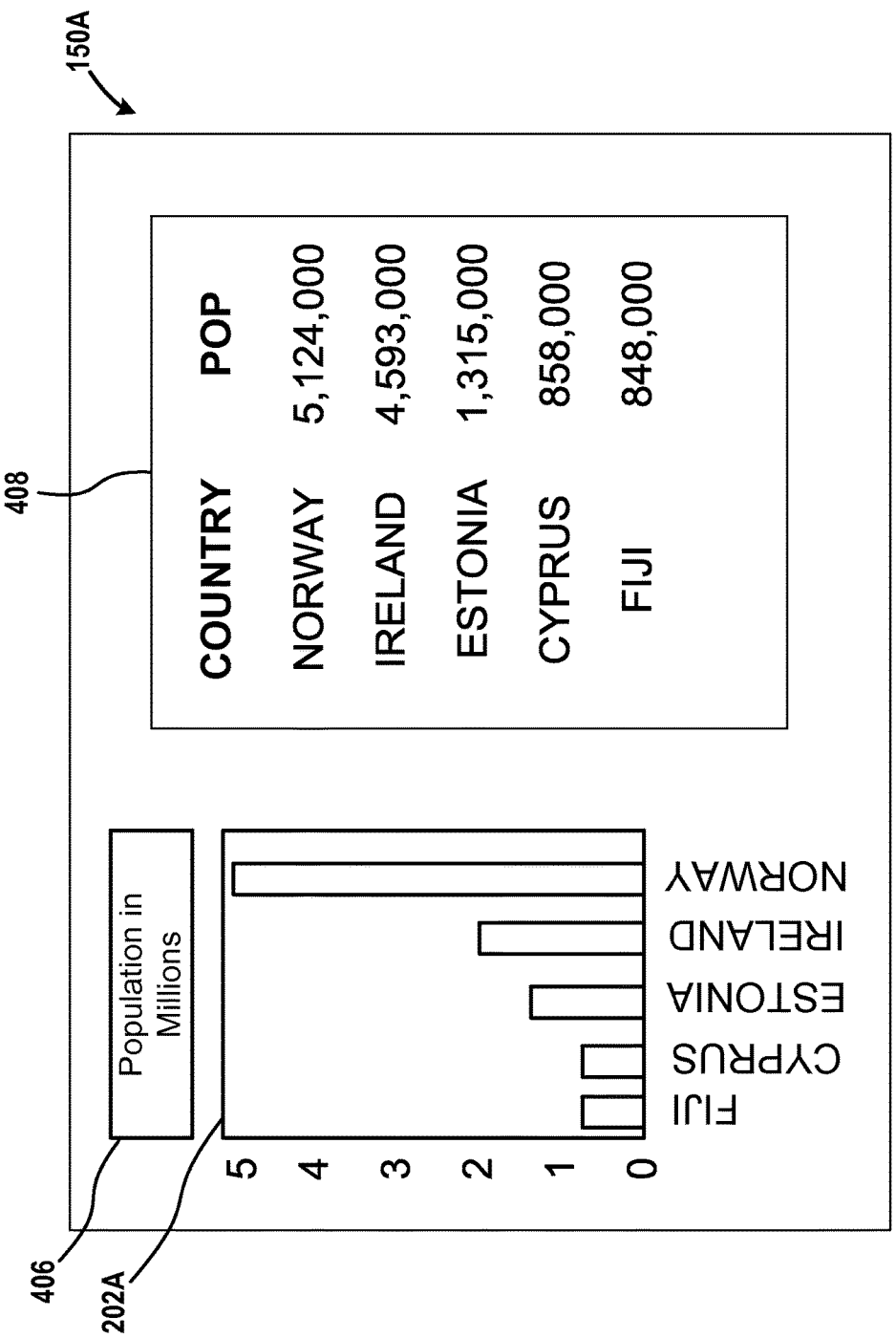
FIG. 4A illustrates an example image that includes a bar chart with a table arranged with data that corresponds to the bar chart.
Figure 4B:
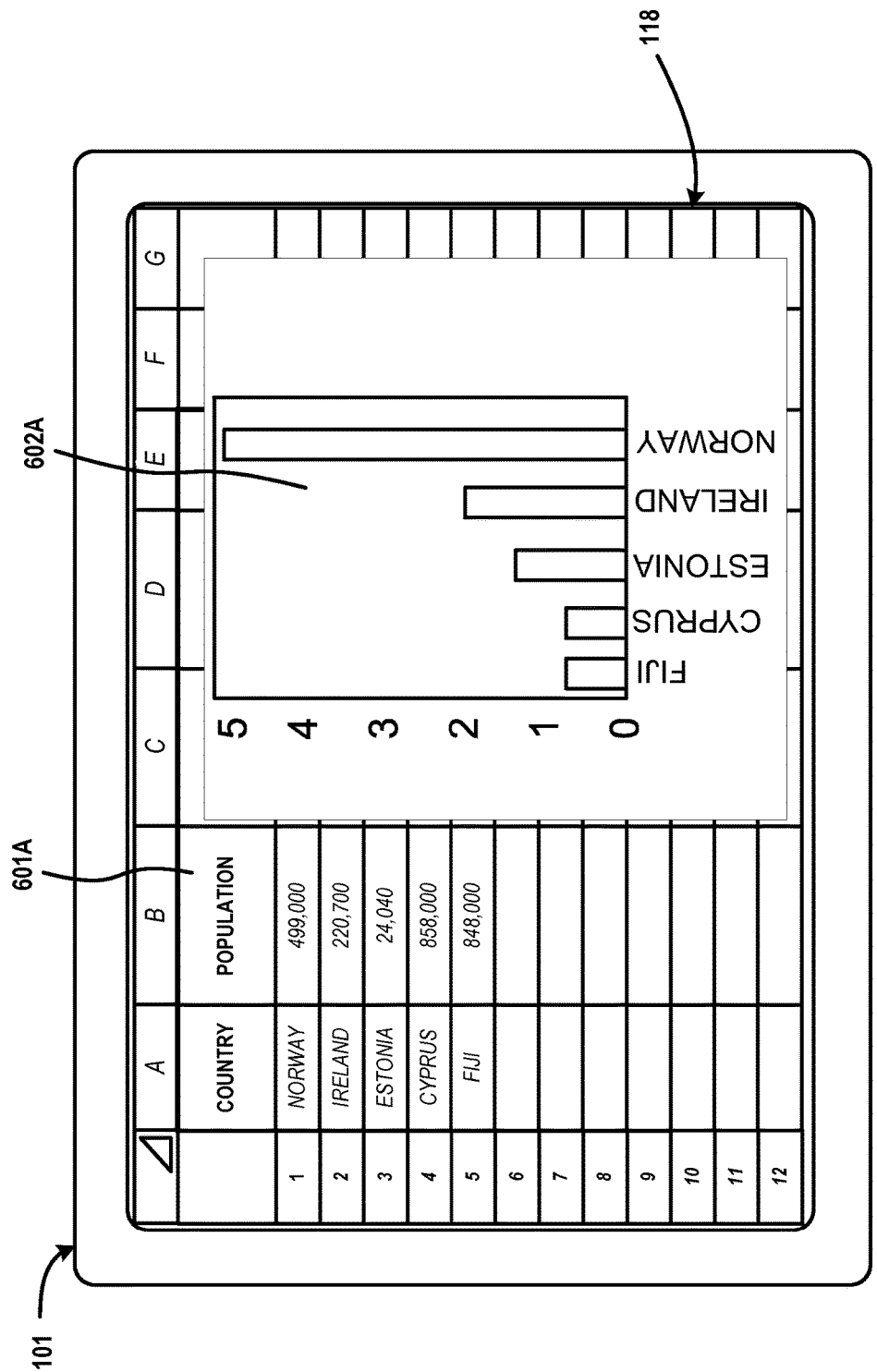
FIG. 4B illustrates a touch-enabled user interface displaying a table of generated data and a bar chart formed from data generated from the image of FIG. 4A.

For illustrative purposes, FIGS. 2, 4A, 4B, 5A and 5B provide illustrative examples of techniques for providing enhanced recognition of charted data. Specifically, the examples of FIGS. 4A and 4B are applied to routine 300 to show how images of a first arrangement 202A and a second arrangement 202B (hereinafter referred to collectively and/or generically as "arrangements 202") may be interpreted to generate a data structure that is configured to display editable charts on the interface 118 of the computing device. Specifically, FIG. 4A shows a first image 150A having descriptive text 406, additional data 408 and the first arrangement 202A, which in this example is in the form of a bar chart. Illustrative examples disclosed herein show how the first image 150A is processed to generate an editable table 601A and a generated chart 602A of FIG. 4B.

Figure 5B:
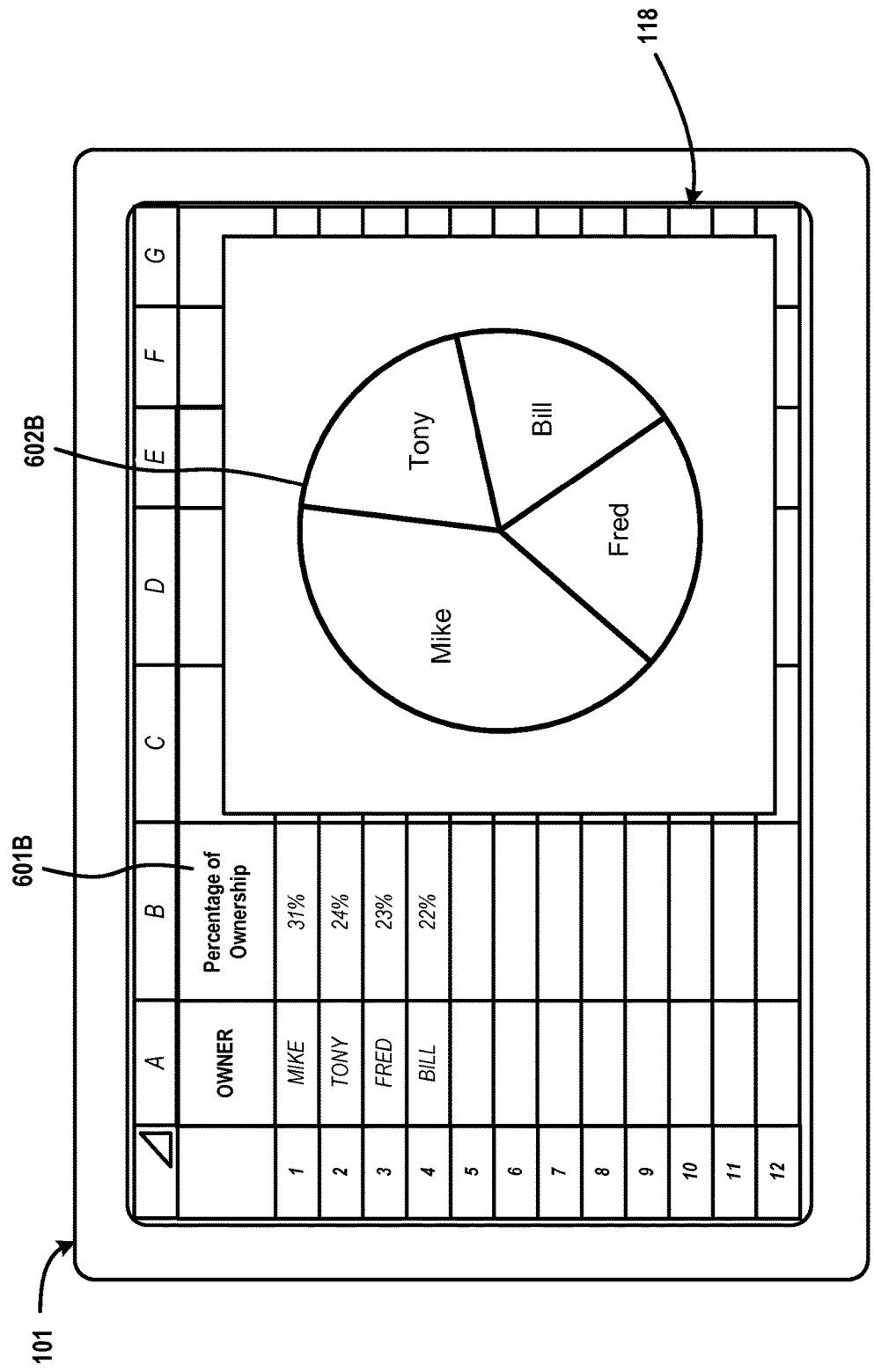
FIG. 5B illustrates a touch-enabled user interface displaying a table of generated data and a pie chart formed from data generated from the image of FIG. 5A.
Figure 6:
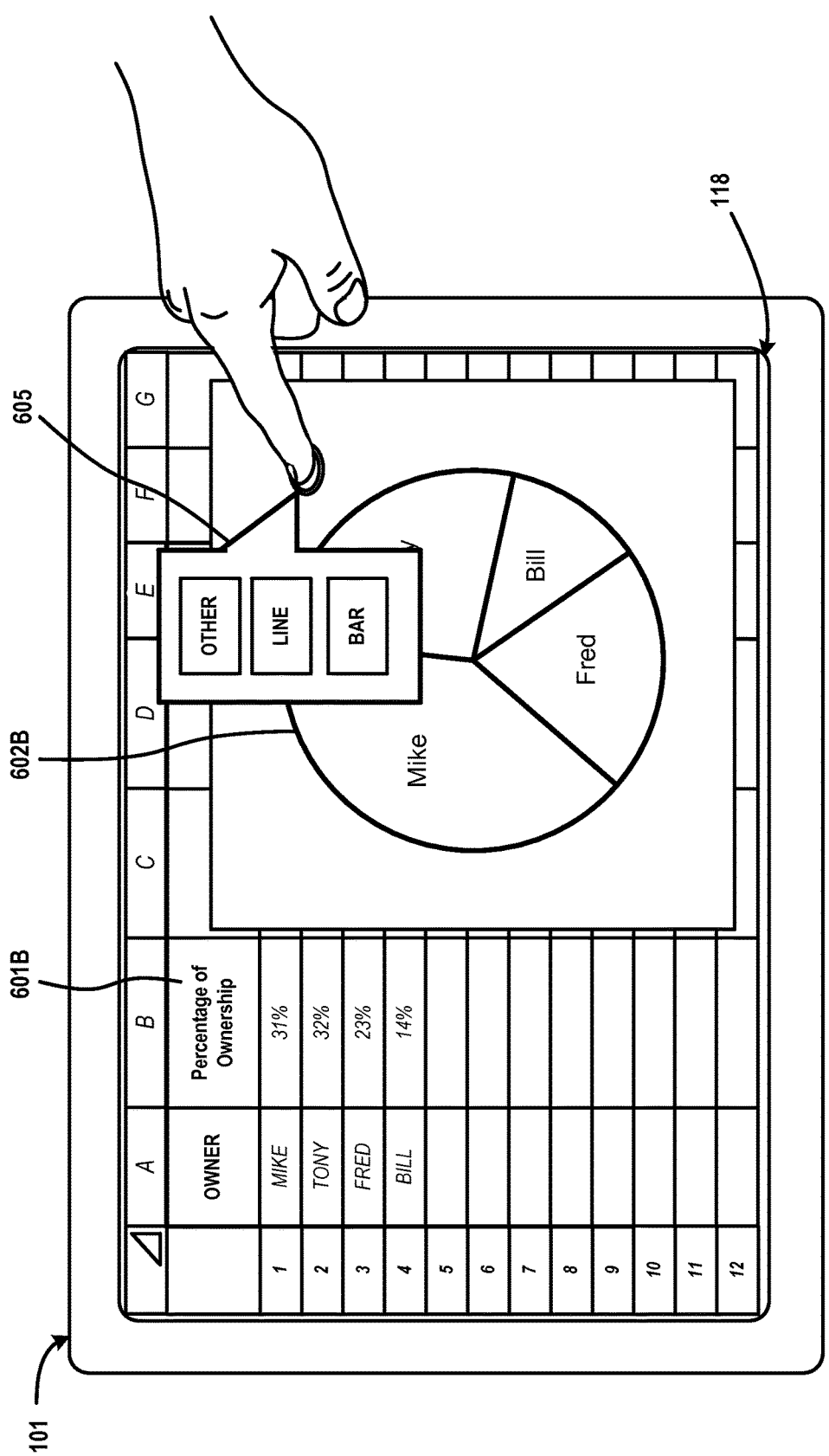
FIG. 6 illustrates the touch-enabled user interface also showing touch-enabled controls that may be used to select a chart type.
Figure 7A:
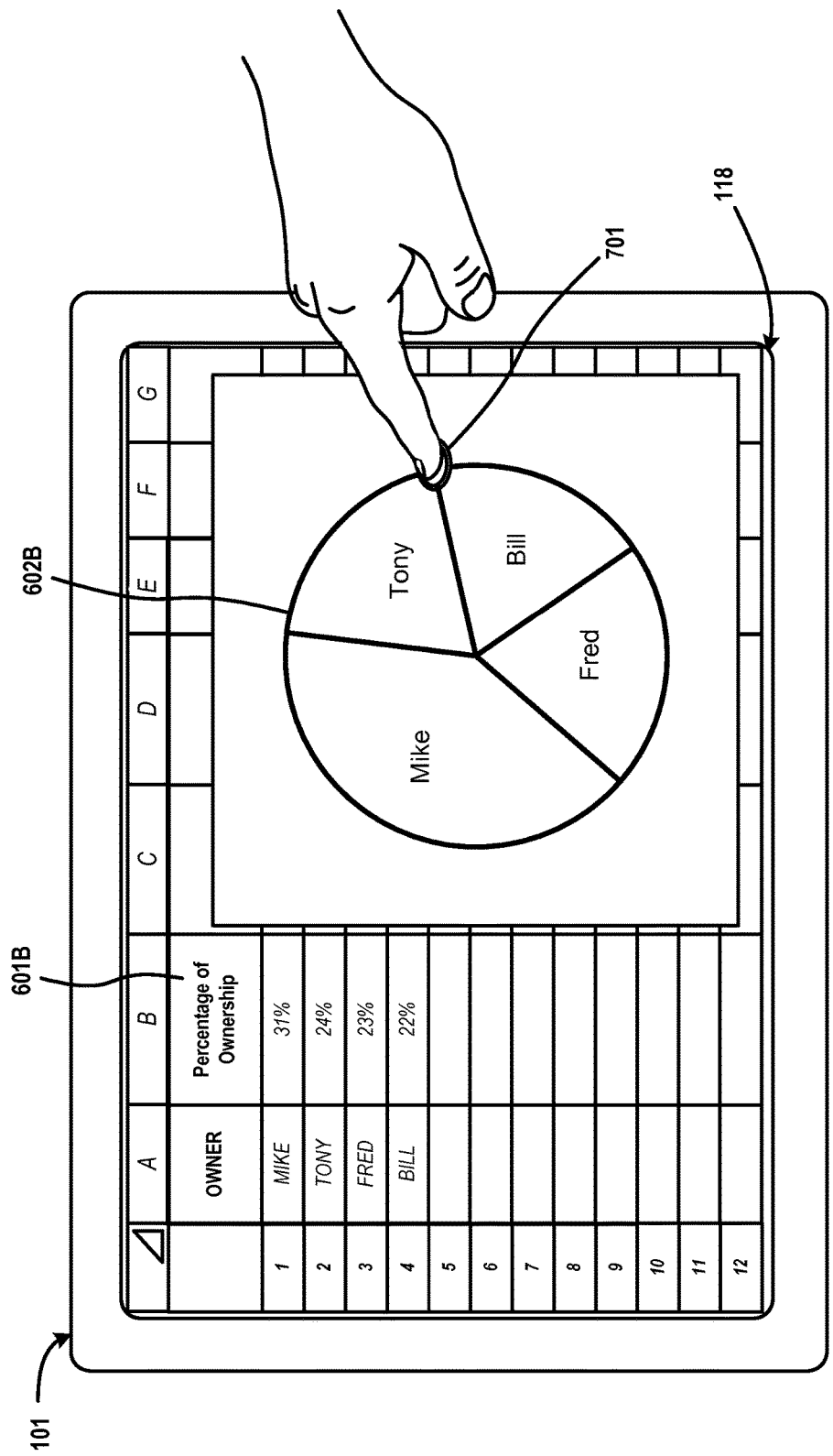
FIG. 7A illustrates the touch-enabled user interface displaying the table of generated data and the pie chart of FIG. 5B also showing touch-enabled controls that may be used to edit the pie chart and the generated data.
Figure 7B:
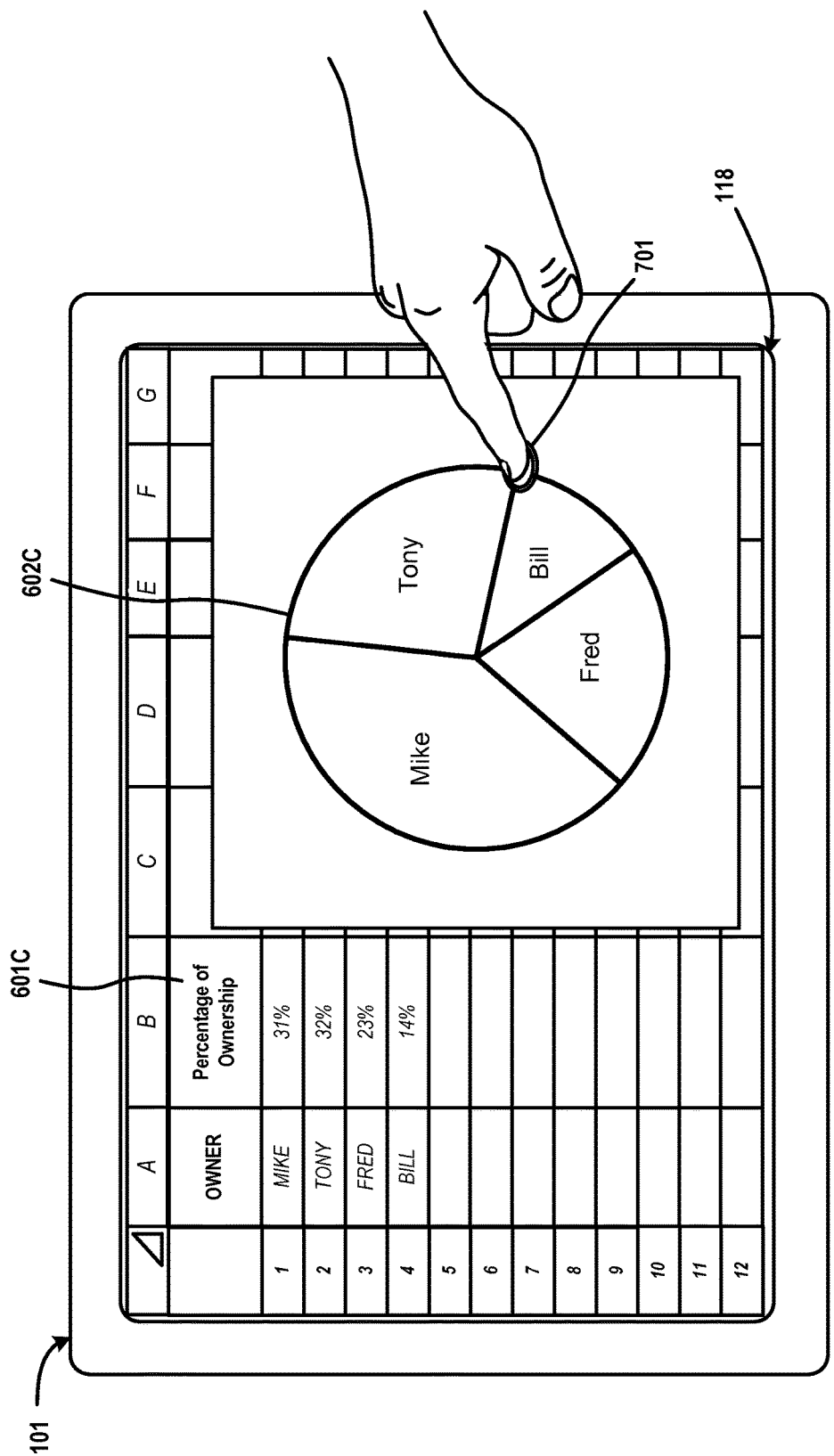
FIG. 7B illustrates the touch-enabled user interface displaying the table of generated data and the pie chart of FIG. 5B showing an example of how the touch-enabled controls are used to modify the pie chart and the generated data.

FIG. 5A shows a second image 150B of the second arrangement 202B, which in this example is in the form of a pie chart. Illustrative examples disclosed herein show how the second image 150B is processed to generate an editable table 601B and a generated chart 602B of FIG. 5B. For illustrative purposes, the first image 150A and the second image 150B are hereinafter referred to collectively and/or generically as "images 150" or "input images 150." In addition, FIGS. 6 and 7A-7B illustrate examples of how generated data and a generated chart are modified and processed using various forms of input, such as a touch-enabled gesture.

The perspective view of FIG. 2 shows how operation 302 of the routine 300 may be used to capture an image by directing the image capture device 116 of the computing device 101 at a medium, such as the first page 210. For example, if the image capture device 116 is directed to the first page 210, the first image 150A, as shown in FIG. 4A, may be captured by the computing device 101. As shown, the first image 150A includes the first arrangement 202A, descriptive text 406 and other data 408. In another example, if the image capture device 116 is directed to the second page 212, a second image 150B may be captured. FIG. 5A provides an illustration of the second image 150B. As shown, the second image 150B includes a second arrangement 202B and descriptive text 506.

Next, in applying operation 304 of routine 300 to the present examples, the program module 111 utilizes one or more techniques to determine values for graphical elements displayed in the images. As summarized above, a determined value may be generated using one or more techniques. In one technique, the program module 111 may measure the size, shape and/or other aspects of a graphical element to determine a value. In applying this technique to the example shown in FIG. 4A, the program module 111 may identify a graphical element. As can be appreciated, a graphical element may include a line, dot, bar, or any other graphical feature that may be used to convey a value. In the identification of a graphical element, the program module 111 may examine the image and identify patterns or shapes that may be a part of lines, bars, dots, etc.

In the example of FIG. 4A, for instance, the program module 111 may identify the series of parallel bars and identify the bars as graphical elements. In other techniques, individual lines may be identified from a series of lines of a line chart. In other techniques, other shapes, dots or markings may be identified by the examination of various markings, patterns, text and/or contextual information, some of which may be interpreted by the use of one or more OCR techniques, such as the OCR techniques disclosed herein.

To identify the value, the program module 111 may measure the length of the bars to determine a value associated with each graphical element. A measurement may be processed with other information interpreted from the image. For instance, since the bar above "NORWAY" has a length that aligns with text indicating a range from zero "0" to five "5," the value associated with the bar may receive a value of 5. Since the graphical element, e.g., the measured bar, is aligned with the text, "NORWAY," the program module 111 may make an association between the graphical element and the text. In addition, the program module may associate the graphical element and the text with the value, and store such data in a data structure.

Other methods of approximation may be used as well. For instance, if values, such as the range from zero "0" to five "5," are not provided in an image, the program module 111 may generate a number based off of a measurement of the length of the bar, and obtain a unit or order of magnitude by an interpretation of contextual information or other information, which may include accessing a remote resource or prompting a user to provide such information. Any method for deriving a value from a graphical element is within the scope of the disclosure.

It can also be appreciated that any single technique or a combination of techniques may be used to determine a value associated with a graphical element. For instance, a line, bar or other graphical element may be measured to obtain one or more values. The one or more values may also be influenced by optically recognizable characters that are on or near, or associated with, the graphical element. In addition, the optically recognizable characters may be used to determine the one or more values without measuring a graphical element.

With reference to the example pie chart of FIG. 5A, a value may be determined by the examination of one or more graphical elements and/or other information associated with the image. In an example involving a chart with non-linear elements, such as a pie chart, the program module 111 may measure relative proportions of one or more graphical elements, such as parts of a circle, to determine one or more values. In processing the second image 150B of FIG. 5A, for example, each section of the pie may be identified as an individual graphical element, and each graphical element may be associated with a label that is interpreted from text of the image. For instance, each section of the pie chart may be identified as a graphical element, and each section may be associated with metadata: Mike, Tony, Bill and Fred.

The determined value for each graphical element may be based on a measurement of surface area, a measurement of the circumference associated with each graphical element, and/or other lines or markings associated with depicted chart. Such measurements may yield values for each graphical element, for example, the graphical element labeled as Mike may be associated with a determined value of "31%" since the associated graphical element takes approximately 31% of the surface area of the pie chart. The determined value, along with other associated data, such as text near and/or aligned with the graphical element, may be stored in a data structure, such as the data file 113.

In the process of determining a value for each graphical element, the program module 111 may also identify a unit that is associated with the graphical elements. In such a process, the program module 111 may examine aspects of the image 150A to determine or identify a unit. For instance, the program module 111 may identify text or other contextual information to determine a unit, such as inches, dollars, meters, etc. In the example of FIG. 4A, the descriptive text 406 may be used to determine a unit. In this example, since the descriptive text 406 states "population in millions," the unit may be characterized as "population" in "millions." The unit may be associated with the determined value and stored in the data structure. As can be appreciated, the determination of one or more units may involve the examination of various markings, patterns, text and/or contextual information, some of which may be interpreted by the use of one or more OCR techniques, such as the OCR techniques disclosed herein.

As can be appreciated, these examples are provided for illustrative purposes and are not to be construed as limiting, as any contextual information, even remotely stored information, may be used to interpret units or other aspects of the image. As can also be appreciated, an association between the determined value and the unit may be based on one or more aspects of the image. For example, text positioned near and/or aligned with certain graphical elements may be interpreted to determine one or more associations made between graphical elements, determined values and units. In addition, other contextual information may be used to determine and/or associate a unit.

In addition to, or as an alternative method to, using techniques for measuring graphical elements, techniques herein may also utilize OCR techniques to determine one or more values associated with graphical elements. In such techniques, when optically recognizable data is provided in an image, the optically recognizable data may be interpreted and used to determine one or more values. In addition, aspects of the image and the optically recognizable data may be used to associate the determined values with one or more graphical elements.

In the example of FIG. 4A, the first image 150A includes optically recognizable data, which in this example is a data table 408. For example, the data table 408 shows values that are graphically aligned with a country title. By the use of one or more OCR techniques, the program module 111 may analyze the text and other aspects of the first image 150A to determine one or more values. For example, the program module 111 may utilize a position, format, alignment and/or pattern of one or more characters to determine one or more values. In the example data table 408 of FIG. 4A, the number "5,124,000" may be stored as a value that is associated with the text "NORWAY," and the number "4,593,000" may be may be stored as a value that is associated with the text "IRELAND," etc. As will be described in more detail below, the determined values may be stored in a data structure, such as data file 113, and used to generate one or more editable graphical charts.

The techniques and examples described herein are provided for illustrative purposes and are not to be construed as limiting. As can be appreciated, techniques for determining one or more values may utilize optically recognizable data, measurements of graphical elements or a combination of these and other information.

Next, in applying operation 308 to the present examples, the program module 111 may generate one or more graphical charts based on the chart type and/or the one or more determined values. FIG. 4B illustrates an example of a generated chart 602A that is in the form of a bar chart. The example shown in FIG. 4B is based on the determined values and chart type that were determined by the processing of the first arrangement 202A, descriptive text 406 and other data 408 depicted in FIG. 4A. In addition, for illustrative purposes, the determined values may also be arranged in the editable table 601A. As can be appreciated, the determined values, and other information, such as the headers may be stored in such an editable data structure, and further used to generate one or more charts. As will be described in more detail below, the generated chart 602A, the determined values and other information displayed on the interface 118 of the computing device 101 may allow a user to interact with and process the generated data.

FIG. 5B illustrates an example of a generated chart 602B that is in the form of a pie chart. The example shown in FIG. 5B is based on the determined values and chart type that were determined by the processing of the second arrangement 202B and descriptive text 506 depicted in FIG. 5A. In addition, for illustrative purposes, the determined values may also be arranged in an editable table 601B. As can be appreciated, the determined values, and other information, such as the headers may be stored in such an editable data structure, and further used to generate one or more charts, such as the generated chart 602B. As will be described in more detail below, the generated chart 602B, the determined values and other information displayed on the interface 118 of the computing device 101 may allow a user to interact with and process the generated data.

As summarized above, techniques and technologies disclosed herein allow for touch-enabled gestures to be applied to the generated data structure. For example, the touch-enabled gestures allow a user to modify, save or otherwise process the data structure. FIG. 6 illustrates the interface 118 of the computing device 101 that enables a user to apply touch-enabled controls to the generated chart 602B and the editable table 601B. As shown, a user may invoke the display of a control, such as a menu 605, that may have one or more mechanism for manipulating and processing the data. In the illustrative example of FIG. 6, the menu 605 allows for the modification of the chart type. As shown, the chart type may be modified to a line chart, a bar chart, or another chart type that is based on the determined values in the editable table 601B. As can be appreciated, if the user selects a new chart type, such as a bar chart, the data of the editable table 601B may be used to generate a bar chart that is displayed on the interface 118. If the user selects the "other" menu item, another menu may appear offering a broader range of chart types.

In other examples, the menu 605 may be configured to provide other commands and/or forms of input. For example, in some scenarios, a chart type may not be determined by the use of the techniques described herein. In such scenarios, the menu 605 may be used to provide the chart type and/or any other desired input.

FIGS. 7A and 7B illustrate another example of how the touch-enabled gestures may be used to modify the data structure. As shown in FIG. 7A, the generated chart 602B contains graphical elements that correspond to the data of the editable table 601B. For instance, the graphical element labeled as "Tony" corresponds to a value of "24%," the graphical element labeled as "Bill" corresponds to a value of "22%," etc. The program module 111 may be configured to receive a command to modify the generated chart 602B and the editable table 601B by allowing a user to touch a particular area, such as the intersection of the outer edge of the circle and one of the dissecting lines. If a user touches one of these areas, a visual indicator 701 may appear to indicate the selection. The program module 111 may be configured to allow a user to modify the generated chart 602B and the editable table 601B by moving the dissecting line.

FIG. 7B shows one example of a modified chart 602C and a modified editable table 601C based on the application of the user control shown in FIG. 7A. As shown, the user may move the selected intersection, which is highlighted by the visual indicator 701, of the generated chart 602B in one or more directions. In this example, the user has moved the intersection of the generated chart 602B in a clockwise direction. This move allows the program module 111 to change the look and feel of any displayed chart, as well as the corresponding data. As shown, modified chart 602C now shows that the graphical element labeled as "Tony" is larger, and the corresponding data for the associated graphical element is now "32%." In addition, the graphical element labeled as "Bill" is smaller, and the corresponding data for the associated graphical element is now "14%."

As can be appreciated, the examples shown above are provided for illustrative purposes and are not to be construed as limiting. Although the examples provided herein apply to modifications to a pie chart, it can be appreciated that other modifications may be made to lines of a line chart, bars of a bar chart, dots of a scatter chart or any other graphical element of another chart type. It can also be appreciated that controls and menus may be configured to allow for other functions. For instance, displayed menus, such as menu 605, may be used to sort, filter and search data of the data structure. It can be appreciated that such touch-enabled controls may involve any function for manipulating, processing, sending or saving the data of the data structure.

In other implementations, other touch-enabled controls may not involve the use of a menu. For example, a user may be able to select, remove, process or otherwise edit data of a particular cell by touching the cell and performing one or more gestures. In one illustrative example, a user may select one or more cells by tapping on the desired cells. Then the user may delete the cells by "flicking" the cells in a particular direction. The same may apply to graphical elements of a chart. A user may select a graphical element by tapping on the desired graphical element. Then the user may delete the graphical element by the use of a "flicking" motion. Other forms of input may be used to modify or process the data of the table 601 as well. For instance, data may be processed, saved, changed or added by the use of voice commands, motion commands collected by an accelerometer and/or gestures captured by the image capture device 116. Although these examples are provided for illustrative purposes, such examples should not be construed as limiting.

Figure 8:
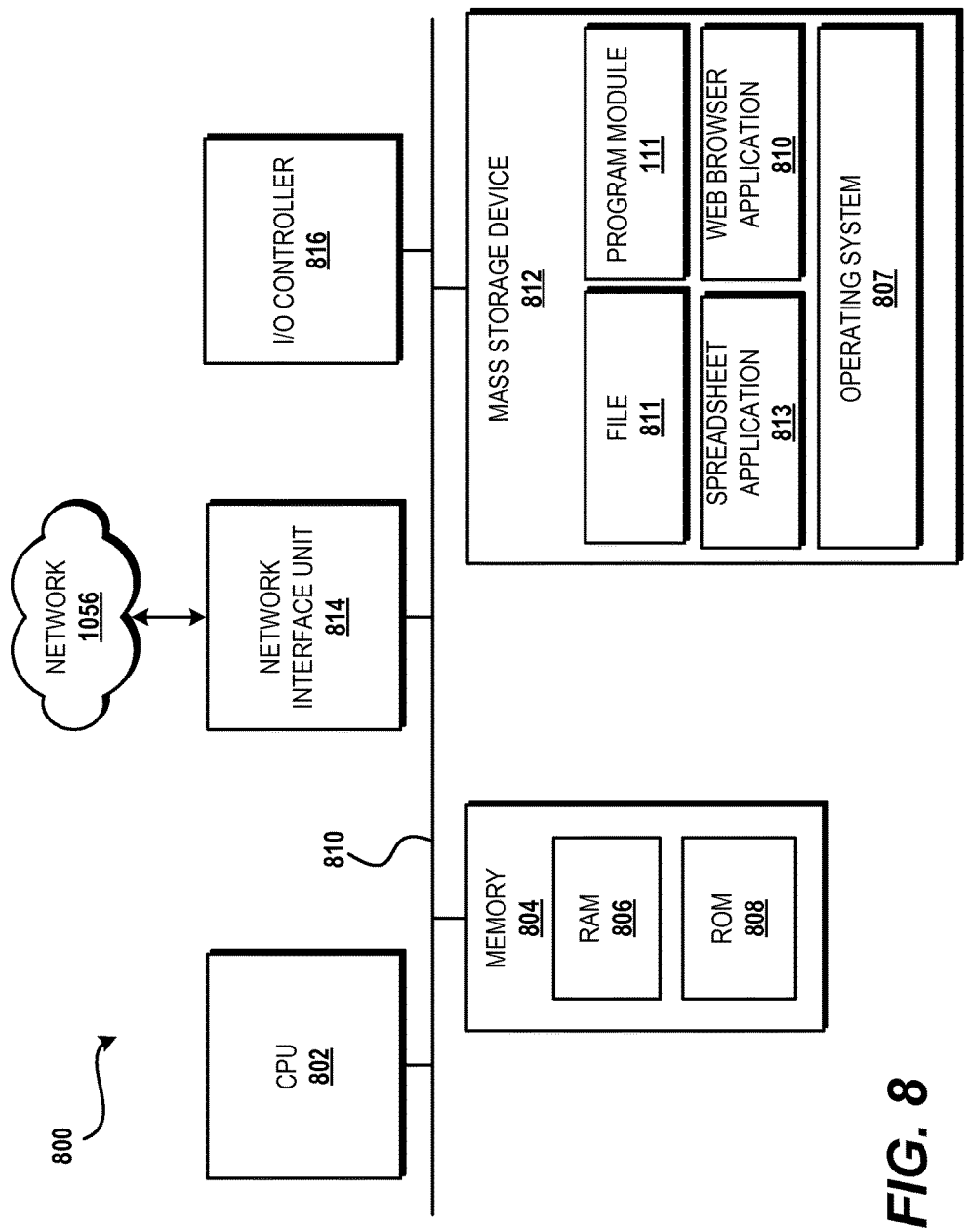
FIG. 8 is a computer architecture diagram illustrating an illustrative computer hardware and software architecture for a computing system capable of implementing aspects of the techniques and technologies presented herein.

FIG. 8 shows additional details of an example computer architecture 800 for a computer, such as the computing device 101 (FIG. 1), capable of executing the program components described above for providing enhanced recognition of charted data. Thus, the computer architecture 800 illustrated in FIG. 8 illustrates an architecture for a server computer, mobile phone, a PDA, a smart phone, a desktop computer, a netbook computer, a tablet computer, and/or a laptop computer. The computer architecture 800 may be utilized to execute any aspects of the software components presented herein.

The computer architecture 800 illustrated in FIG. 8 includes a central processing unit 802 ("CPU"), a system memory 804, including a random access memory 806 ("RAM") and a read-only memory ("ROM") 808, and a system bus 810 that couples the memory 804 to the CPU 802. A basic input/output system containing the basic routines that help to transfer information between elements within the computer architecture 800, such as during startup, is stored in the ROM 808. The computer architecture 800 further includes a mass storage device 812 for storing an operating system 807, and one or more application programs including, but not limited to, the spreadsheet application 813, program module 111, and a web browser application 810. The illustrated mass storage device 812 may also store a file 811, which may be a spreadsheet file or a file configured to store a table or spreadsheet or chart.

The mass storage device 812 is connected to the CPU 802 through a mass storage controller (not shown) connected to the bus 810. The mass storage device 812 and its associated computer-readable media provide non-volatile storage for the computer architecture 800. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 800. For purposes the claims, the phrase "computer storage medium," "computer-readable storage medium" and variations thereof, does not include waves, signals, and/or other transitory and/or intangible communication media, per se.

According to various configurations, the computer architecture 800 may operate in a networked environment using logical connections to remote computers through the network 1056 and/or another network (not shown). The computer architecture 800 may connect to the network 1056 through a network interface unit 814 connected to the bus 810. It should be appreciated that the network interface unit 814 also may be utilized to connect to other types of networks and remote computer systems. The computer architecture 800 also may include an input/output controller 816 for receiving and processing input from a number of other devices, including a keyboard, mouse, or electronic stylus (not shown in FIG. 8). Similarly, the input/output controller 816 may provide output to a display screen, a printer, or other type of output device (also not shown in FIG. 8).

It should be appreciated that the software components described herein may, when loaded into the CPU 802 and executed, transform the CPU 802 and the overall computer architecture 800 from a general-purpose computing system into a special-purpose computing system customized to facilitate the functionality presented herein. The CPU 802 may be constructed from any number of transistors or other discrete circuit elements, which may individually or collectively assume any number of states. More specifically, the CPU 802 may operate as a finite-state machine, in response to executable instructions contained within the software modules disclosed herein. These computer-executable instructions may transform the CPU 802 by specifying how the CPU 802 transitions between states, thereby transforming the transistors or other discrete hardware elements constituting the CPU 802.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 800 in order to store and execute the software components presented herein. It also should be appreciated that the computer architecture 800 may include other types of computing devices, including hand-held computers, embedded computer systems, personal digital assistants, and other types of computing devices known to those skilled in the art. It is also contemplated that the computer architecture 800 may not include all of the components shown in FIG. 8, may include other components that are not explicitly shown in FIG. 8, or may utilize an architecture completely different than that shown in FIG. 8.

Figure 9:
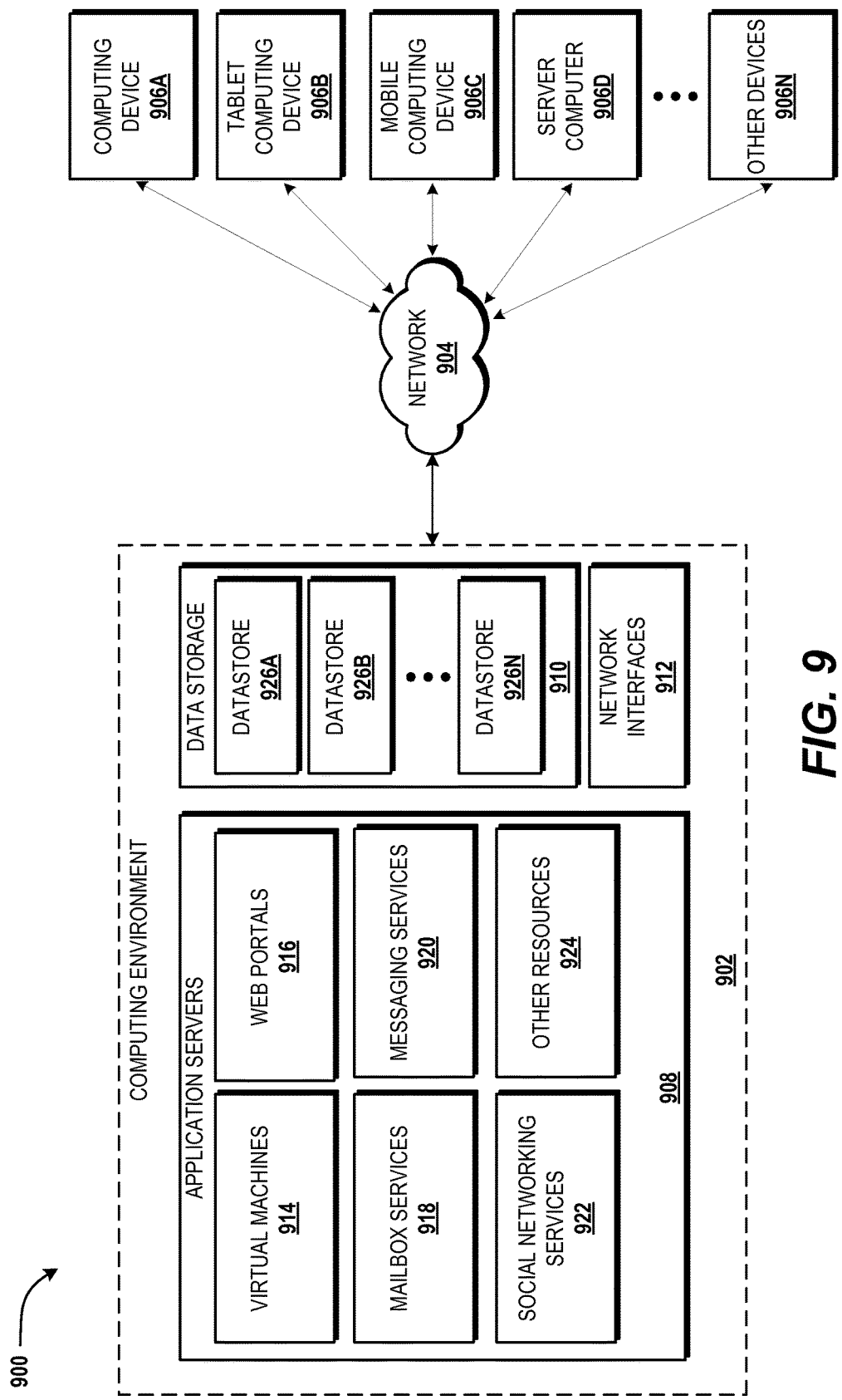
FIG. 9 is a diagram illustrating a distributed computing environment capable of implementing aspects of the techniques and technologies presented herein.

FIG. 9 depicts an illustrative distributed computing environment 900 capable of executing the software components described herein for providing enhanced recognition of charted data, among other aspects. Thus, the distributed computing environment 900 illustrated in FIG. 9 can be utilized to execute any aspects of the software components presented herein. For example, the distributed computing environment 900 can be utilized to execute aspects of the spreadsheet application 813, the program module 111 and/or other software components described herein.

According to various implementations, the distributed computing environment 900 includes a computing environment 902 operating on, in communication with, or as part of the network 904. The network 904 may be or may include the network 1056, described above with reference to FIG. 8. The network 904 also can include various access networks. One or more client devices 906A-906N (hereinafter referred to collectively and/or generically as "clients 906") can communicate with the computing environment 902 via the network 904 and/or other connections (not illustrated in FIG. 9). In one illustrated configuration, the clients 906 include a computing device 906A such as a laptop computer, a desktop computer, or other computing device; a slate or tablet computing device ("tablet computing device") 906B; a mobile computing device 906C such as a mobile telephone, a smart phone, or other mobile computing device; a server computer 906D; and/or other devices 906N. It should be understood that any number of clients 906 can communicate with the computing environment 902. Two example computing architectures for the clients 906 are illustrated and described herein with reference to FIGS. 8 and 10. It should be understood that the illustrated clients 906 and computing architectures illustrated and described herein are illustrative, and should not be construed as being limited in any way.

In the illustrated configuration, the computing environment 902 includes application servers 908, data storage 910, and one or more network interfaces 912. According to various implementations, the functionality of the application servers 908 can be provided by one or more server computers that are executing as part of, or in communication with, the network 904. The application servers 908 can host various services, virtual machines, portals, and/or other resources. In the illustrated configuration, the application servers 908 host one or more virtual machines 914 for hosting applications or other functionality. According to various implementations, the virtual machines 914 host one or more applications and/or software modules for providing enhanced recognition of charted data. It should be understood that this configuration is illustrative, and should not be construed as being limiting in any way. The application servers 908 also host or provide access to one or more portals, link pages, Web sites, and/or other information ("Web portals") 916.

According to various implementations, the application servers 908 also include one or more mailbox services 918 and one or more messaging services 920. The mailbox services 918 can include electronic mail ("email") services. The mailbox services 918 also can include various personal information management ("PIM") services including, but not limited to, calendar services, contact management services, collaboration services, and/or other services. The messaging services 920 can include, but are not limited to, instant messaging services, chat services, forum services, and/or other communication services.

The application servers 908 also may include one or more social networking services 922. The social networking services 922 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 922 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 922 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 922 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 922 are not mentioned herein for the sake of brevity. As such, the above configurations are illustrative, and should not be construed as being limited in any way. According to various implementations, the social networking services 922 may host one or more applications and/or software modules for providing the functionality described herein for providing enhanced recognition of charted data. For instance, any one of the application servers 908 may communicate or facilitate the functionality and features described herein. For instance, a social networking application, mail client, messaging client or a browser running on a phone or any other client 906 may communicate with a networking service 922 and facilitate the functionality, even in part, described above with respect to FIG. 3.

As shown in FIG. 9, the application servers 908 also can host other services, applications, portals, and/or other resources ("other resources") 924. The other resources 924 can include, but are not limited to, OCR or spreadsheet display functionality. It thus can be appreciated that the computing environment 902 can provide integration of the concepts and technologies disclosed herein provided herein with various mailbox, messaging, social networking, and/or other services or resources.

As mentioned above, the computing environment 902 can include the data storage 910. According to various implementations, the functionality of the data storage 910 is provided by one or more databases operating on, or in communication with, the network 904. The functionality of the data storage 910 also can be provided by one or more server computers configured to host data for the computing environment 902. The data storage 910 can include, host, or provide one or more real or virtual datastores 926A-926N (hereinafter referred to collectively and/or generically as "datastores 926"). The datastores 926 are configured to host data used or created by the application servers 908 and/or other data. Although not illustrated in FIG. 9, the datastores 926 also can host or store spreadsheet documents, data structures, algorithms for execution by a recommendation engine, and/or other data utilized by a spreadsheet application program or another module, such as the program module 111. Aspects of the datastores 926 may be associated with a service, such as ONEDRIVE, DROPBOX or GOOGLEDRIVE.

The computing environment 902 can communicate with, or be accessed by, the network interfaces 912. The network interfaces 912 can include various types of network hardware and software for supporting communications between two or more computing devices including, but not limited to, the clients 906 and the application servers 908. It should be appreciated that the network interfaces 912 also may be utilized to connect to other types of networks and/or computer systems.

It should be understood that the distributed computing environment 900 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 900 provides the software functionality described herein as a service to the clients 906. It should be understood that the clients 906 can include real or virtual machines including, but not limited to, server computers, web servers, personal computers, mobile computing devices, smart phones, and/or other devices. As such, various configurations of the concepts and technologies disclosed herein enable any device configured to access the distributed computing environment 900 to utilize the functionality described herein for providing enhanced recognition of charted data, among other aspects. In one specific example, as summarized above, techniques described herein may be implemented, at least in part, by the web browser application 810 of FIG. 8, which works in conjunction with the application servers 908 of FIG. 9.

Figure 10:
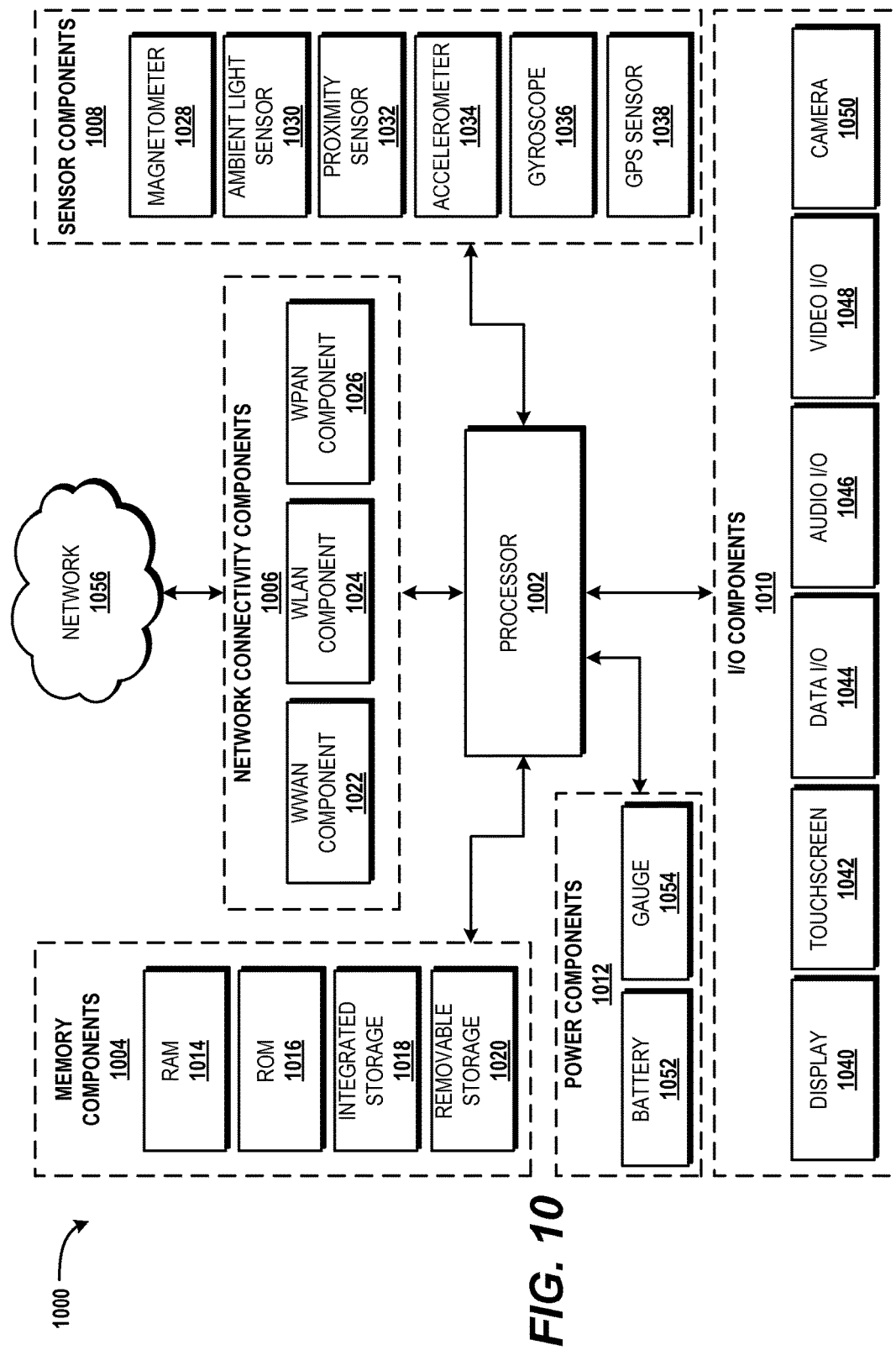
FIG. 10 is a computer architecture diagram illustrating a computing device architecture for a computing device capable of implementing aspects of the techniques and technologies presented herein.

Turning now to FIG. 10, an illustrative computing device architecture 1000 for a computing device that is capable of executing various software components described herein for providing enhanced recognition of charted data. The computing device architecture 1000 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 1000 is applicable to any of the clients 906 shown in FIG. 9. Moreover, aspects of the computing device architecture 1000 may be applicable to traditional desktop computers, portable computers (e.g., laptops, notebooks, ultra-portables, and netbooks), server computers, and other computer systems, such as described herein with reference to FIG. 8. For example, the single touch and multi-touch aspects disclosed herein below may be applied to desktop computers that utilize a touchscreen or some other touch-enabled device, such as a touch-enabled track pad or touch-enabled mouse.

The computing device architecture 1000 illustrated in FIG. 10 includes a processor 1002, memory components 1004, network connectivity components 1006, sensor components 1008, input/output components 1010, and power components 1012. In the illustrated configuration, the processor 1002 is in communication with the memory components 1004, the network connectivity components 1006, the sensor components 1008, the input/output ("I/O") components 1010, and the power components 1012. Although no connections are shown between the individuals components illustrated in FIG. 10, the components can interact to carry out device functions. In some configurations, the components are arranged so as to communicate via one or more busses (not shown).

The processor 1002 includes a central processing unit ("CPU") configured to process data, execute computer-executable instructions of one or more application programs, and communicate with other components of the computing device architecture 1000 in order to perform various functionality described herein. The processor 1002 may be utilized to execute aspects of the software components presented herein and, particularly, those that utilize, at least in part, a touch-enabled input.

In some configurations, the processor 1002 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 1002 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 1002 is, or is included in, a system-on-chip ("SoC") along with one or more of the other components described herein below. For example, the SoC may include the processor 1002, a GPU, one or more of the network connectivity components 1006, and one or more of the sensor components 1008. In some configurations, the processor 1002 is fabricated, in part, utilizing a package-on-package ("PoP") integrated circuit packaging technique. The processor 1002 may be a single core or multi-core processor.

The processor 1002 may be created in accordance with an ARM architecture, available for license from ARM HOLDINGS of Cambridge, United Kingdom. Alternatively, the processor 1002 may be created in accordance with an x86 architecture, such as is available from INTEL CORPORATION of Mountain View, Calif. and others. In some configurations, the processor 1002 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 1004 include a random access memory ("RAM") 1014, a read-only memory ("ROM") 1016, an integrated storage memory ("integrated storage") 1018, and a removable storage memory ("removable storage") 1020. In some configurations, the RAM 1014 or a portion thereof, the ROM 1016 or a portion thereof, and/or some combination the RAM 1014 and the ROM 1016 is integrated in the processor 1002. In some configurations, the ROM 1016 is configured to store a firmware, an operating system or a portion thereof (e.g., operating system kernel), and/or a bootloader to load an operating system kernel from the integrated storage 1018 and/or the removable storage 1020.

The integrated storage 1018 can include a solid-state memory, a hard disk, or a combination of solid-state memory and a hard disk. The integrated storage 1018 may be soldered or otherwise connected to a logic board upon which the processor 1002 and other components described herein also may be connected. As such, the integrated storage 1018 is integrated in the computing device. The integrated storage 1018 is configured to store an operating system or portions thereof, application programs, data, and other software components described herein.

The removable storage 1020 can include a solid-state memory, a hard disk, or a combination of solid-state memory and a hard disk. In some configurations, the removable storage 1020 is provided in lieu of the integrated storage 1018. In other configurations, the removable storage 1020 is provided as additional optional storage. In some configurations, the removable storage 1020 is logically combined with the integrated storage 1018 such that the total available storage is made available as a total combined storage capacity. In some configurations, the total combined capacity of the integrated storage 1018 and the removable storage 1020 is shown to a user instead of separate storage capacities for the integrated storage 1018 and the removable storage 1020.

The removable storage 1020 is configured to be inserted into a removable storage memory slot (not shown) or other mechanism by which the removable storage 1020 is inserted and secured to facilitate a connection over which the removable storage 1020 can communicate with other components of the computing device, such as the processor 1002. The removable storage 1020 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 1004 can store an operating system. According to various configurations, the operating system includes, but is not limited to, SYMBIAN OS from SYMBIAN LIMITED, WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 1006 include a wireless wide area network component ("WWAN component") 1022, a wireless local area network component ("WLAN component") 1024, and a wireless personal area network component ("WPAN component") 1026. The network connectivity components 1006 facilitate communications to and from the network 1056 or another network, which may be a WWAN, a WLAN, or a WPAN. Although only the network 1056 is illustrated, the network connectivity components 1006 may facilitate simultaneous communication with multiple networks, including the network 904 of FIG. 9. For example, the network connectivity components 1006 may facilitate simultaneous communications with multiple networks via one or more of a WWAN, a WLAN, or a WPAN.

The network 1056 may be or may include a WWAN, such as a mobile telecommunications network utilizing one or more mobile telecommunications technologies to provide voice and/or data services to a computing device utilizing the computing device architecture 1000 via the WWAN component 1022. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 1056 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 104 may be configured to provide voice and/or data communications with any combination of the above technologies. The network 1056 may be configured to or adapted to provide voice and/or data communications in accordance with future generation technologies.

In some configurations, the WWAN component 1022 is configured to provide dual-multi-mode connectivity to the network 1056. For example, the WWAN component 1022 may be configured to provide connectivity to the network 1056, wherein the network 1056 provides service via GSM and UMTS technologies, or via some other combination of technologies. Alternatively, multiple WWAN components 1022 may be utilized to perform such functionality, and/or provide additional functionality to support other non-compatible technologies (i.e., incapable of being supported by a single WWAN component). The WWAN component 1022 may facilitate similar connectivity to multiple networks (e.g., a UMTS network and an LTE network).

The network 1056 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 1024 is configured to connect to the network 1056 via the WI-FI access points. Such connections may be secured via various encryption technologies including, but not limited, WI-FI Protected Access ("WPA"), WPA2, Wired Equivalent Privacy ("WEP"), and the like.

The network 1056 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 1026 is configured to facilitate communications with other devices, such as peripherals, computers, or other computing devices via the WPAN.

The sensor components 1008 include a magnetometer 1028, an ambient light sensor 1030, a proximity sensor 1032, an accelerometer 1034, a gyroscope 1036, and a Global Positioning System sensor ("GPS sensor") 1038. It is contemplated that other sensors, such as, but not limited to, temperature sensors or shock detection sensors, also may be incorporated in the computing device architecture 1000.

The magnetometer 1028 is configured to measure the strength and direction of a magnetic field. In some configurations the magnetometer 1028 provides measurements to a compass application program stored within one of the memory components 1004 in order to provide a user with accurate directions in a frame of reference including the cardinal directions, north, south, east, and west. Similar measurements may be provided to a navigation application program that includes a compass component. Other uses of measurements obtained by the magnetometer 1028 are contemplated.

The ambient light sensor 1030 is configured to measure ambient light. In some configurations, the ambient light sensor 1030 provides measurements to an application program stored within one the memory components 1004 in order to automatically adjust the brightness of a display (described below) to compensate for low-light and high-light environments. Other uses of measurements obtained by the ambient light sensor 1030 are contemplated.

The proximity sensor 1032 is configured to detect the presence of an object or thing in proximity to the computing device without direct contact. In some configurations, the proximity sensor 1032 detects the presence of a user's body (e.g., the user's face) and provides this information to an application program stored within one of the memory components 1004 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 1032 are contemplated.

The accelerometer 1034 is configured to measure proper acceleration. In some configurations, output from the accelerometer 1034 is used by an application program as an input mechanism to control some functionality of the application program. For example, the application program may be a video game in which a character, a portion thereof, or an object is moved or otherwise manipulated in response to input received via the accelerometer 1034. In some configurations, output from the accelerometer 1034 is provided to an application program for use in switching between landscape and portrait modes, calculating coordinate acceleration, or detecting a fall. Other uses of the accelerometer 1034 are contemplated.

The gyroscope 1036 is configured to measure and maintain orientation. In some configurations, output from the gyroscope 1036 is used by an application program as an input mechanism to control some functionality of the application program. For example, the gyroscope 1036 can be used for accurate recognition of movement within a 3D environment of a video game application or some other application. In some configurations, an application program utilizes output from the gyroscope 1036 and the accelerometer 1034 to enhance control of some functionality of the application program. Other uses of the gyroscope 1036 are contemplated.

The GPS sensor 1038 is configured to receive signals from GPS satellites for use in calculating a location. The location calculated by the GPS sensor 1038 may be used by any application program that requires or benefits from location information. For example, the location calculated by the GPS sensor 1038 may be used with a navigation application program to provide directions from the location to a destination or directions from the destination to the location. Moreover, the GPS sensor 1038 may be used to provide location information to an external location-based service, such as E911 service. The GPS sensor 1038 may obtain location information generated via WI-FI, WIMAX, and/or cellular triangulation techniques utilizing one or more of the network connectivity components 1006 to aid the GPS sensor 1038 in obtaining a location fix. The GPS sensor 1038 may also be used in Assisted GPS ("A-GPS") systems.

The I/O components 1010 include a display 1040, a touchscreen 1042, a data I/O interface component ("data I/O") 1044, an audio I/O interface component ("audio I/O") 1046, a video I/O interface component ("video I/O") 1048, and a camera 1050. In some configurations, the display 1040 and the touchscreen 1042 are combined. In some configurations two or more of the data I/O component 1044, the audio I/O component 1046, and the video I/O component 1048 are combined. The I/O components 1010 may include discrete processors configured to support the various interface described below, or may include processing functionality built-in to the processor 1002.

The display 1040 is an output device configured to present information in a visual form. In particular, the display 1040 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 1040 is a liquid crystal display ("LCD") utilizing any active or passive matrix technology and any backlighting technology (if used). In some configurations, the display 1040 is an organic light emitting diode ("OLED") display. Other display types are contemplated.

The touchscreen 1042, also referred to herein as a "touch-enabled screen," is an input device configured to detect the presence and location of a touch. The touchscreen 1042 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 1042 is incorporated on top of the display 1040 as a transparent layer to enable a user to use one or more touches to interact with objects or other information presented on the display 1040. In other configurations, the touchscreen 1042 is a touch pad incorporated on a surface of the computing device that does not include the display 1040. For example, the computing device may have a touchscreen incorporated on top of the display 1040 and a touch pad on a surface opposite the display 1040.

In some configurations, the touchscreen 1042 is a single-touch touchscreen. In other configurations, the touchscreen 1042 is a multi-touch touchscreen. In some configurations, the touchscreen 1042 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 1042. As such, a developer may create gestures that are specific to a particular application program.

In some configurations, the touchscreen 1042 supports a tap gesture in which a user taps the touchscreen 1042 once on an item presented on the display 1040. The tap gesture may be used for various reasons including, but not limited to, opening or launching whatever the user taps. In some configurations, the touchscreen 1042 supports a double tap gesture in which a user taps the touchscreen 1042 twice on an item presented on the display 1040. The double tap gesture may be used for various reasons including, but not limited to, zooming in or zooming out in stages. In some configurations, the touchscreen 1042 supports a tap and hold gesture in which a user taps the touchscreen 1042 and maintains contact for at least a pre-defined time. The tap and hold gesture may be used for various reasons including, but not limited to, opening a context-specific menu.

In some configurations, the touchscreen 1042 supports a pan gesture in which a user places a finger on the touchscreen 1042 and maintains contact with the touchscreen 1042 while moving the finger on the touchscreen 1042. The pan gesture may be used for various reasons including, but not limited to, moving through screens, images, or menus at a controlled rate. Multiple finger pan gestures are also contemplated. In some configurations, the touchscreen 1042 supports a flick gesture in which a user swipes a finger in the direction the user wants the screen to move. The flick gesture may be used for various reasons including, but not limited to, scrolling horizontally or vertically through menus or pages. In some configurations, the touchscreen 1042 supports a pinch and stretch gesture in which a user makes a pinching motion with two fingers (e.g., thumb and forefinger) on the touchscreen 1042 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 1042. As such, the above gestures should be understood as being illustrative and should not be construed as being limiting in any way.

The data I/O interface component 1044 is configured to facilitate input of data to the computing device and output of data from the computing device. In some configurations, the data I/O interface component 1044 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 1046 is configured to provide audio input and/or output capabilities to the computing device. In some configurations, the audio I/O interface component 1046 includes a microphone configured to collect audio signals. In some configurations, the audio I/O interface component 1046 includes a headphone jack configured to provide connectivity for headphones or other external speakers. In some configurations, the audio I/O interface component 1046 includes a speaker for the output of audio signals. In some configurations, the audio I/O interface component 1046 includes an optical audio cable out.

The video I/O interface component 1048 is configured to provide video input and/or output capabilities to the computing device. In some configurations, the video I/O interface component 1048 includes a video connector configured to receive video as input from another device (e.g., a video media player such as a DVD or BLURAY player) or send video as output to another device (e.g., a monitor, a television, or some other external display). In some configurations, the video I/O interface component 1048 includes a High-Definition Multimedia Interface ("HDMI"), mini-HDMI, micro-HDMI, DisplayPort, or proprietary connector to input/output video content. In some configurations, the video I/O interface component 1048 or portions thereof is combined with the audio I/O interface component 1046 or portions thereof.

The camera 1050 can be configured to capture still images and/or video. The camera 1050 may utilize a charge coupled device ("CCD") or a complementary metal oxide semiconductor ("CMOS") image sensor to capture images. In some configurations, the camera 1050 includes a flash to aid in taking pictures in low-light environments. Settings for the camera 1050 may be implemented as hardware or software buttons.

Although not illustrated, one or more hardware buttons may also be included in the computing device architecture 1000. The hardware buttons may be used for controlling some operational aspect of the computing device. The hardware buttons may be dedicated buttons or multi-use buttons. The hardware buttons may be mechanical or sensor-based.

The illustrated power components 1012 include one or more batteries 1052, which can be connected to a battery gauge 1054. The batteries 1052 may be rechargeable or disposable. Rechargeable battery types include, but are not limited to, lithium polymer, lithium ion, nickel cadmium, and nickel metal hydride. Each of the batteries 1052 may be made of one or more cells.

The battery gauge 1054 can be configured to measure battery parameters such as current, voltage, and temperature. In some configurations, the battery gauge 1054 is configured to measure the effect of a battery's discharge rate, temperature, age and other factors to predict remaining life within a certain percentage of error. In some configurations, the battery gauge 1054 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 1012 may also include a power connector, which may be combined with one or more of the aforementioned I/O components 1010. The power components 1012 may interface with an external power system or charging equipment via an I/O component.

The disclosure presented herein may be considered in view of the following clauses.

Clause 1: A computer-implemented example comprising computer-implemented operations for obtaining an image (150A) of a chart (202) having one or more graphical elements; determining a value for an individual graphical element of the one or more graphical elements; determining a chart type based on an arrangement of the one or more graphical elements; and generating an editable graphical chart (602) based on the chart type and the value for the individual graphical element.

Clause 2: The example of Clause 1, further including computer-implemented operations for generating an editable table storing the value for the individual graphical element of the one or more graphical elements.

Clause 3: The example of Clauses 1 and 2, wherein determining the value for the individual graphical element comprises measuring the individual graphical element to obtain the value, wherein the value is based on the measurement of the individual graphical element.

Clause 4: The example of Clauses 1-3, wherein determining the value for the individual graphical element comprises measuring a length of the individual graphical element to obtain the value, wherein the value is based on the length of the individual graphical element.

Clause 5: The example of Clauses 1-4, wherein determining the value for the individual graphical element comprises measuring an area of the individual graphical element to obtain the value, wherein the value is based on, at least in part, the area of the individual graphical element.

Clause 6: The example of Clauses 1-5, wherein determining the value for the individual graphical element includes: identifying optically recognizable data that is associated with the individual graphical element; and determining the value based on, at least in part, an interpretation of the optically recognizable data.

Clause 7: The example of Clauses 1-6, wherein determining the value for the individual graphical element includes: measuring the individual graphical element to obtain the value, wherein the value is based on the measurement of the graphical element; identifying a unit; and associating the value with the unit.

Clause 8: An example computer (800, 1000), including a processor (802, 1002); and a computer-readable storage medium (804, 1004) in communication with the processor (802, 1002), the computer-readable storage medium (804, 1004) having computer-executable instructions stored thereupon which, when executed by the processor (802, 1002), cause the computer (800, 1000) to obtain an image (150) of a chart having one or more graphical elements, determine a value for an individual graphical element of the one or more graphical elements, determine a chart type based on an arrangement of the one or more graphical elements, and generate an editable graphical chart (602) based on the chart type and the value for the individual graphical element.

Clause 9: The example of Clause 8, wherein the computer-readable storage medium has further computer-executable instructions stored thereupon, which when executed by the processor, cause the computer to generate an editable table storing the value for the individual graphical element of the one or more graphical elements.

Clause 10: The example of Clauses 8 and 9, wherein determining the value for the individual graphical element comprises measuring the individual graphical element to obtain the value or measuring at least one angle associated with the individual graphical element to obtain the value.

Clause 11: The example of Clauses 8-10, wherein determining the value for the individual graphical element comprises measuring a length of the individual graphical element to obtain the value, wherein the value is based on the length of the individual graphical element.

Clause 12: The example of Clauses 8-11, wherein determining the value for the individual graphical element comprises measuring an area of the individual graphical element to obtain the value, wherein the value is based on the area of the individual graphical element.

Clause 13: The example of Clauses 8-12, wherein the computer-readable storage medium has further computer-executable instructions stored thereupon, which when executed by the processor, cause the computer to display the editable graphical chart on an interface configured to receive an input gesture for modifying a data structure containing the editable graphical chart, wherein the display of the editable graphical chart is performed simultaneously as a camera of the computer is obtaining the image; receive the input gesture to modify the data structure; modify the data structure based on the input gesture; and display a modified version of the editable graphical chart based on the input gesture.

Clause 14: An example computer-readable storage medium having computer-executable instructions stored thereupon which, when executed by a computer, cause the computer to: obtain an image (150) of a chart having one or more graphical elements; determine a value for an individual graphical element of the one or more graphical elements; determine a chart type based on an arrangement of the one or more graphical elements; and generate an editable graphical chart (602) based on the chart type and the value for the individual graphical element.

Clause 15: The example of Clause 14, wherein the computer-readable storage medium comprises further computer-executable instructions stored thereupon for causing the computer to generate an editable table storing the value for the individual graphical element of the one or more graphical elements, wherein the editable graphical chart and the editable table are stored in a data structure, and wherein the data structure further comprises metadata representing the image.

Clause 16: The example of Clauses 14-15, wherein the chart contained in the image includes at least one color, an orientation, a layout or a format, wherein the editable graphical chart is further based on the at least one color, the orientation, the layout or the format.

Clause 17: The example of Clauses 14-16, wherein determining the value for the individual graphical element comprises measuring a length of the individual graphical element to obtain the value, wherein the value is based on the length of the individual graphical element.

Clause 18: The example of Clauses 14-17, wherein determining the value for the individual graphical element comprises measuring an area of the individual graphical element to obtain the value, wherein the value is based on, at least in part, the area of the individual graphical element.

Clause 19: The example of Clauses 14-18, wherein determining the value for the individual graphical element includes: identifying optically recognizable data that is associated with the individual graphical element; and determining the value based, at least in part, on an interpretation of the optically recognizable data.

Clause 20: The example of Clauses 14-19, wherein determining the value for the individual graphical element includes: measuring the individual graphical element to obtain the value, wherein the value is based on the measurement of the individual graphical element; identifying a unit; and associating the value with the unit.

Based on the foregoing, it should be appreciated that concepts and technologies have been disclosed herein that for provide enhanced optical character recognition of charted data. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example configurations and applications illustrated and described, and without departing from the true spirit and scope of the present invention, which is set forth in the following claims.

What is claimed is:

1. A computer-implemented method comprising computer-implemented operations for:
    obtaining an image of a chart having one or more graphical elements;
    analyzing the image of the chart to identify an arrangement of the one or more graphical elements and a size of an individual graphical element of the one or more graphical elements;
    determining a value for the individual graphical element based on the size of the individual graphical element, wherein analyzing the image to identify the size comprises measuring the individual graphical element to obtain the size, wherein the value is based on at least one relative proportion of the individual graphical element with respect to at least one other individual graphical element;
    determining a chart type based on the arrangement of the one or more graphical elements; and
    generating an editable graphical chart based on the chart type and the value for the individual graphical element.

2. The computer-implemented method of claim 1, further comprising computer-implemented operations for generating an editable table storing the value for the individual graphical element of the one or more graphical elements.

3. The computer-implemented method of claim 1, wherein analyzing the image to identify the size of the individual graphical element comprises measuring a length of the individual graphical element to obtain the size, wherein the value is based on the length of the individual graphical element.

4. The computer-implemented method of claim 1, wherein analyzing the image to identify the size of the individual graphical element comprises measuring an area of the individual graphical element to obtain the size, wherein the value is based on, the area of the individual graphical element.

5. The computer-implemented method of claim 1, wherein determining the value for the individual graphical element comprises:
    identifying optically recognizable data that is associated with the individual graphical element; and
    determining the value based, at least in part, on an interpretation of the optically recognizable data.

6. The computer-implemented method of claim 1, wherein determining the value for the individual graphical element comprises:
    measuring the individual graphical element to obtain a measurement of the individual graphical element, wherein the value is based on the measurement of the individual graphical element;
    identifying a unit; and
    associating the value with the unit.

7. A computer, comprising:
    a processor; and
    a computer-readable storage medium in communication with the processor, the computer-readable storage medium having computer-executable instructions stored thereupon which, when executed by the processor, cause the computer to:
    obtain an image of a chart having one or more graphical elements;
    determine a length for an individual graphical element of the one or more graphical elements;
    determine a value corresponding to the individual graphical element based on the length of the individual graphical element, wherein the value is based on measuring the individual graphical element to identify at least one relative proportion of the individual graphical element with respect to at least one other individual graphical element;
    determine a chart type based on an arrangement of the one or more graphical elements; and
    generate an editable graphical chart based on the chart type and the value corresponding to-the individual graphical element.

8. The computer of claim 7, wherein the computer-readable storage medium has further computer-executable instructions stored thereupon, which when executed by the processor, cause the computer to generate an editable table storing the value for the individual graphical element of the one or more graphical elements.

9. The computer of claim 7, wherein determining the value for the individual graphical element comprises measuring the individual graphical element to obtain the value or measuring at least one angle associated with the individual graphical element to obtain the value.

10. The computer of claim 7, wherein determining the value for the individual graphical element comprises analyzing the image of the chart to measure the length of the individual graphical element to obtain the value.

11. The computer of claim 7, wherein determining the value for the individual graphical element comprises analyzing the image of the chart to measure an area of the individual graphical element to obtain the value, wherein the value is based on the area of the individual graphical element.

12. The computer of claim 7, wherein the computer-readable storage medium has further computer-executable instructions stored thereupon, which when executed by the processor, cause the computer to:

display the editable graphical chart on an interface configured to receive an input gesture for modifying a data structure containing the editable graphical chart;

receive the input gesture to modify the data structure;

modify the data structure based on the input gesture; and display a modified version of the editable graphical chart based on the input gesture.

13. A computer-readable storage medium having computer-executable instructions stored thereupon which, when executed by a computer, cause the computer to:

obtain an image of a chart having one or more graphical elements in an arrangement that corresponds to at least one of a bar chart, a pie chart, a scatter chart, or a line chart;

analyzing the image of the chart to identify the arrangement of the one or more graphical elements;

determine a value for an individual graphical element of the one or more graphical elements, wherein the value is based on measuring the individual graphical element to identify at least one relative proportion of the individual graphical element with respect to at least one other individual graphical element;

determine a chart type based on the arrangement of the one or more graphical elements; and generate an editable graphical chart based on the chart type and the value for the individual graphical element.

14. The computer-readable storage medium of claim 13, wherein the computer-readable storage medium comprises further computer-executable instructions stored thereupon for causing the computer to generate an editable table storing the value for the individual graphical element of the one or more graphical elements, wherein the editable graphical chart and the editable table are stored in a data structure, and wherein the data structure further comprises metadata representing the image.

15. The computer-readable storage medium of claim 13, wherein the chart contained in the image includes at least one of a color, an orientation, a layout, or a format, wherein the editable graphical chart is further based on the at least one of the color, the orientation, the layout, or the format.

16. The computer-readable storage medium of claim 13, wherein determining the value for the individual graphical element comprises measuring a length of the individual graphical element to obtain the value, wherein the value is based on the length of the individual graphical element.

17. The computer-readable storage medium of claim 13, wherein determining the value for the individual graphical element comprises measuring an area of the individual graphical element to obtain the value, wherein the value is based, at least in part, on the area of the individual graphical element.

18. The computer-readable storage medium of claim 13, wherein determining the value for the individual graphical element comprises:

identifying optically recognizable data that is associated with the individual graphical element; and determining the value based, at least in part, on an interpretation of the optically recognizable data.

19. The computer-readable storage medium of claim 13, wherein determining the value for the individual graphical element comprises:

measuring the individual graphical element to obtain a measurement, wherein the value is based on the measurement of the individual graphical element;

identifying a unit; and associating the value with the unit.

* * * * *